(12) United States Patent
Jeong et al.

(10) Patent No.: US 12,517,419 B2
(45) Date of Patent: Jan. 6, 2026

(54) OPTICAL IMAGING SYSTEM

(71) Applicant: SAMSUNG ELECTRO-MECHANICS CO., LTD., Suwon-si (KR)

(72) Inventors: You Jin Jeong, Suwon-si (KR); Jae Hyuk Huh, Suwon-si (KR); Byung Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/360,266

(22) Filed: Jul. 27, 2023

(65) Prior Publication Data

US 2024/0152037 A1     May 9, 2024

(30) Foreign Application Priority Data

Nov. 9, 2022    (KR) .................. 10-2022-0148695
Mar. 17, 2023    (KR) .................. 10-2023-0035167

(51) Int. Cl.
*G03B 17/17*      (2021.01)
*G02B 9/12*       (2006.01)
*G02B 13/00*      (2006.01)

(52) U.S. Cl.
CPC .............. *G03B 17/17* (2013.01); *G02B 9/12* (2013.01); *G02B 13/0035* (2013.01); *G02B 13/0065* (2013.01)

(58) Field of Classification Search
CPC .. G02B 9/12; G02B 13/0035; G02B 13/0065; G02B 13/007; G03B 17/17
USPC ................. 359/735, 645, 791, 792
See application file for complete search history.

(56) References Cited

U.S. PATENT DOCUMENTS

| | | | |
|---|---|---|---|
| 10,802,251 B2 | 10/2020 | Lin et al. | |
| 12,038,622 B2 * | 7/2024 | Huh | .......... G02B 9/60 |
| 2015/0253647 A1 | 9/2015 | Mercado | |
| 2015/0358519 A1 | 12/2015 | Kamei | |
| 2018/0017767 A1 * | 1/2018 | Chen | ........ G02B 27/646 |
| 2018/0143403 A1 * | 5/2018 | Tseng | ........ G02B 13/0065 |
| 2019/0377158 A1 | 12/2019 | Liao et al. | |
| 2021/0092263 A1 | 3/2021 | Jung | |
| 2021/0103124 A1 * | 4/2021 | Chen | ........ G02B 13/0065 |
| 2021/0349287 A1 | 11/2021 | Yeh et al. | |
| 2022/0091373 A1 * | 3/2022 | Saiga | ........ G02B 13/007 |

(Continued)

FOREIGN PATENT DOCUMENTS

| | | | | | |
|---|---|---|---|---|---|
| CN | 111929859 A | * | 11/2020 | ......... | G02B 13/0035 |
| CN | 112532813 A | * | 3/2021 | .......... | H04M 1/0264 |

(Continued)

OTHER PUBLICATIONS

Machine translation of CN 111929859 retrieved electronically from PE2E Search Sep. 26, 2023 (Year: 2023).*

(Continued)

*Primary Examiner* — Cara E Rakowski
(74) *Attorney, Agent, or Firm* — NSIP Law

(57) ABSTRACT

An optical imaging system includes a first lens, a second lens, a third lens, a reflective member, and an image sensor sequentially arranged from an object side. The reflective member includes at least two reflective surfaces to change a path of light passing through the first to third lenses and incident on the reflective member at least twice.

11 Claims, 28 Drawing Sheets

(56) References Cited

U.S. PATENT DOCUMENTS

| | | | |
|---|---|---|---|
| 2022/0137337 A1* | 5/2022 | Yao | G02B 9/16 359/716 |
| 2022/0163706 A1* | 5/2022 | Feldman | G02B 5/04 |
| 2022/0214527 A1* | 7/2022 | Hua | G02B 13/0035 |
| 2022/0294945 A1* | 9/2022 | Zhao | G03B 17/17 |
| 2022/0326480 A1 | 10/2022 | Kim et al. | |
| 2023/0089031 A1* | 3/2023 | Huh | G02B 13/004 359/736 |
| 2023/0113899 A1* | 4/2023 | Byun | G02B 13/02 359/716 |
| 2023/0116701 A1* | 4/2023 | Huh | G02B 13/02 348/340 |

FOREIGN PATENT DOCUMENTS

| | | |
|---|---|---|
| CN | 113219628 A | 8/2021 |
| CN | 114815164 A | 7/2022 |
| JP | 2015-229059 A | 12/2015 |
| KR | 10-2022-0118301 A | 8/2022 |
| KR | 10-2022-0138778 A | 10/2022 |
| KR | 10-2453386 B1 | 10/2022 |
| TW | 202001324 A | 1/2020 |
| WO | WO 2019/126516 A1 | 6/2019 |
| WO | WO 2021/138633 A1 | 7/2021 |
| WO | WO-2021184167 A1 * | 9/2021 ......... G02B 13/0035 |

OTHER PUBLICATIONS

Machine translation of CN 112532813 retrieved electronically from PE2E Search Sep. 27, 2023 (Year: 2023).*
Byun et al. U.S. Appl. No. 17/678,462, filed Feb. 23, 2022.*
Huh et al. U.S. Appl. No. 17/900,314, filed Aug. 31, 2022.*
Lim et al. U.S. Appl. No. 18/093,052, filed Jan. 4, 2023.*
Huh et al. U.S. Appl. No. 18/361,622, filed Jul. 28, 2023.*
Jeong et al. U.S. Appl. No. 18/362,008, filed Jul. 31, 2023.*
Huh et al. U.S. Appl. No. 18/365,628, filed Aug. 4, 2023.*
Gross et al. "Handbook of Optical Systems vol. 3: Aberration Theory and Correction of Optical Systems" Weinheim Germany, Wiley-VCH Verlag GmbH & Co. KGaA, pp. 377-379 (Year: 2007).*
Huh et al. U.S. Appl. No. 18/361,662, filed Jul. 28, 2023 (Year: 2023).*
Taiwanese Office Action issued on Mar. 8, 2024, in counterpart Taiwanese Patent Application No. 112129623 (5 pages in English, 6 pages in Chinese).
Korean Office Action issued on Jun. 19, 2024, in counterpart Korean Patent Application No. 10-2023-0035167 (8 pages in English, 6 pages in Korean).

* cited by examiner

OPTICAL IMAGING SYSTEM

CROSS-REFERENCE TO RELATED APPLICATION(S)

This application claims the benefit under 35 USC 119(a) of Korean Patent Applications No. 10-2022-0148695 filed on Nov. 9, 2022 and No. 10-2023-0035167 filed on Mar. 17, 2023 in the Korean Intellectual Property Office, the entire disclosures of which are incorporated herein by reference for all purposes.

BACKGROUND

1. Field

The following description relates to an optical imaging system.

2. Description of Background

Various types of camera modules have been installed in portable terminals, and in particular, demand for a folded camera module to which a telephoto lens with a long focal length is applied is increasing. Since a telephoto lens has a long focal length, it is necessary to secure a sufficient back focal length (BFL). However, the size of the camera module inevitably increases for a longer BFL, which is disadvantageous.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a reflective member, and an image sensor sequentially arranged from an object side. The reflective member includes at least two reflective surfaces configured to change a path of light passing through the first to third lenses and incident on the reflective member at least twice.

The reflective member may be a parallelogram-shaped prism.

The first lens may have positive refractive power, the second lens have negative refractive power, and the third lens may have positive refractive power or negative refractive power.

At least one of the first to third lenses may be made of a plastic material.

Any one of the first to third lenses may be made of a plastic material, another lens may be made of a glass material, and the remaining lens may be made of a glass material or a plastic material.

The optical imaging system may satisfy $50<v1<90$, where $v1$ is an Abbe number of the first lens.

The optical imaging system may satisfy $1<TTL/f<1.4$, where TTL is a distance from an object-side surface of the first lens to an imaging surface of the image sensor, and f is a focal length of the optical imaging system.

The optical imaging system may satisfy $0.1<LL/PL<0.4$, where LL is a distance from an object-side surface of the first lens to an image-side surface of the third lens, and PL is a length of the path of the light in the reflective member.

At least one of an object-side surface of the first lens and an object-side surface of the third lens may be convex.

At least one of an image-side surface of the second lens and an image-side surface of the third lens may be concave.

In another general aspect, an optical imaging system includes: a plurality of lenses including a first lens, a second lens, and a third lens; an image sensor having an imaging surface; and a prism disposed between the plurality of lenses and the image sensor and including a plurality of reflective surfaces each configured to reflect light, wherein $0.1<LL/PL<0.4$ in which LL is a distance from an object-side surface of the first lens to an image-side surface of the third lens, and PL is a length of a path of the light in the prism.

The prism may have a parallelogram shape having first and second reflective surfaces.

The first lens may have positive refractive power, and the object-side surface of the first lens may be convex.

The optical imaging system may satisfy $50<v1<90$, where $v1$ is an Abbe number of the first lens.

The optical imaging system may satisfy $0 \leq v1-v2<56$, where $v1$ is an Abbe number of the first lens, and $v2$ is an Abbe number of the second lens.

The optical imaging system may satisfy $0.02<BFL/f<1.0$, where BFL is a distance from the image-side surface of the third lens to the imaging surface of the image sensor on an optical axis, and f is a focal length of the optical imaging system.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
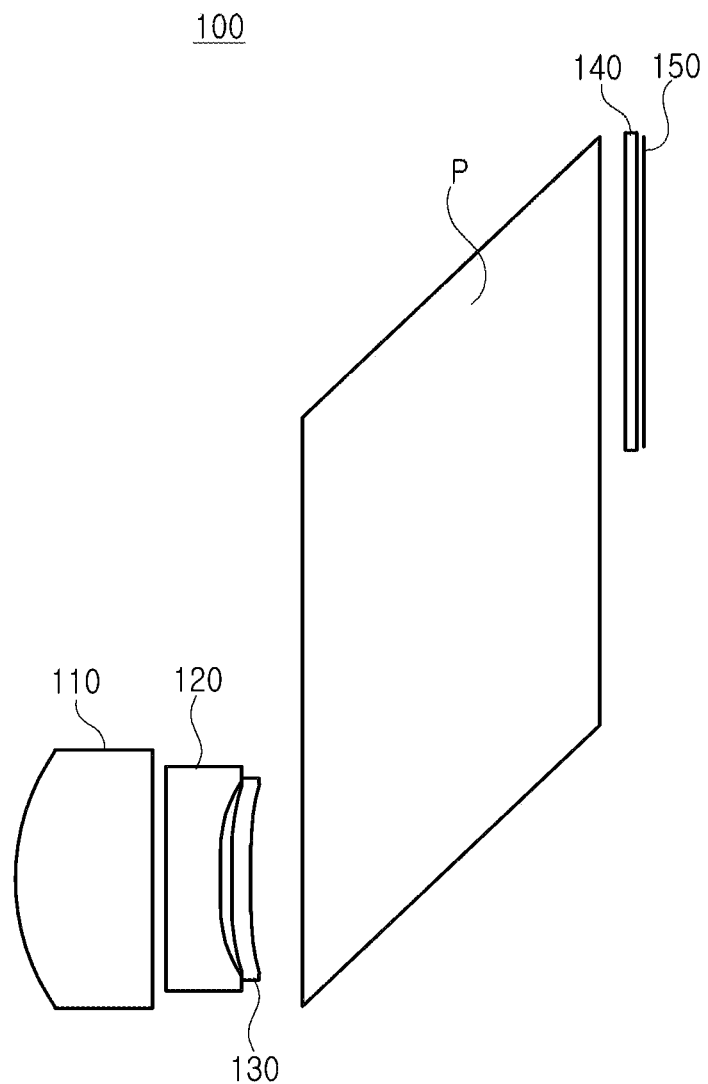
FIG. 1 is a diagram illustrating an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the accompanying drawings, thicknesses, sizes, and shapes of lenses have been slightly exaggerated for convenience of explanation. Particularly, shapes of spherical surfaces or aspherical surfaces illustrated in the drawings are illustrated by way of example. That is, the shapes of the spherical surfaces or the aspherical surfaces are not limited to those illustrated in the drawings.

An optical imaging system according to the various examples disclosed herein may include three lenses arranged along an optical axis. For example, the optical imaging system may include a first lens, a second lens, and a third lens that are sequentially arranged from an object side.

In the various examples, the first lens refers to a lens closest to an object (or a subject), while the third lens refers to a lens closest to an imaging surface (or an image sensor).

Further, a first surface of each lens refers to a surface close to the object side (or an object-side surface) and a second surface of each lens refers to a surface close to an image side (or an image-side surface).

In the various examples, all of radii of curvature and thicknesses of lenses, TTL (a distance from the object-side surface of the first lens to the imaging surface), LL (a distance from the object-side surface of the first lens to the image-side surface of the third lens), PL (a length of a path of light in a prism), f (focal length), and IMH (a half of a diagonal length of the imaging surface) are represented by millimeters (mm).

Further, in a description for each of the lenses of the various examples, the meaning that one surface of a lens is convex is that a paraxial region (a very small region in the vicinity of the optical axis) of the corresponding surface is convex, and the meaning that one surface of a lens is concave is that a paraxial region of the corresponding surface is concave. Therefore, even in a case where it is described that one surface of a lens is convex, an edge portion of the lens may be concave. Likewise, even in a case where it is described that one surface of a lens is concave, an edge portion of the lens may be convex.

The optical imaging system according to the various examples may include a light path changing unit that refracts incident light. For example, the light path changing unit may be a prism and may be disposed on the image side. For example, the prism may be disposed behind the third lens (or on the image side of the third lens).

In addition, the optical imaging system according to the various examples may include an image sensor (or imaging element) for converting an image of a subject incident through the optical system into an electrical signal and an infrared cut-off filter for blocking infrared rays. The infrared cut-off filter may be disposed between the prism and the image sensor.

Further, the optical imaging system according to the various examples may include a stop for adjusting an amount of light. For example, the stop may be disposed on the object side of the first lens or between the second lens and the third lens.

According to the various examples, the plurality of lenses may be formed of a material having a refractive index different from that of air. For example, the first to third lenses may be formed of a plastic material or a glass material. In addition, the optical imaging system according to the various examples may include a lens formed of a plastic material, and may optionally include a lens formed of a glass material.

At least one of the plurality of lenses may have an aspherical surface. For example, at least one of the first to third lenses may have an aspherical surface. Alternatively, at least one of the first surface or the second surface of each of the first to third lenses may be aspherical. The aspherical surface of each of the first to third lens may be represented by the following Equation 1.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20}$$

In Equation 1, c is an inverse of a radius of curvature of the lens, K is a conic constant, Y is a distance from a certain point on an aspherical surface of the lens to the optical axis, A to H and J are a fourth-order aspherical constant to a twentieth-order aspherical constant, and Z (or SAG) is a distance from the certain point on the aspherical surface of the lens to an apex of the aspherical surface of the lens in an optical axis direction.

The first to third lenses included in the optical imaging system according to the various examples may have positive refractive power/negative refractive power/positive or negative refractive power sequentially from the object side. In addition, at least one of the first to third lenses may be formed of a plastic material, and may optionally be formed of a glass material. The optical imaging system according to the various examples may include a reflective member having at least two reflective surfaces. For example, the reflective member may be a parallelogram-shaped prism, and the prism may be disposed on the image side of the third lens, in other words, between the third lens and the image sensor (or the infrared cut-off filter).

The optical imaging system according to the various examples may satisfy at least one of the following Conditional Expressions 1 to 9.

| | |
|---|---|
| $1 < TTL/f < 1.4$ | [Conditional Expression 1] |
| $50 < v1 < 90$ | [Conditional Expression 2] |
| $0.1 < LL/PL < 0.4$ | [Conditional Expression 3] |
| $0.2 < f1/f < 0.8$ | [Conditional Expression 4] |
| $-20 < f2/f < -0.3$ | [Conditional Expression 5] |
| $-3.5 < f3/f < 6.2$ | [Conditional Expression 6] |
| $0 \leq v1 - v2 < 56$ | [Conditional Expression 7] |
| $0.80 \leq PL/f < 0.98$ | [Conditional Expression 8] |
| $0.02 < BFL/f < 1.0$ | [Conditional Expression 9] |

In the above conditional expressions, TTL is the distance from the object-side surface of the first lens to the imaging surface, f is the focal length of the optical imaging system, v1 is the Abbe number of the first lens, and LL is the distance from the object-side surface of the first lens to the image-side surface of the third lens, PL is the length of the path of the light in the prism, and BFL is a distance from the image-side surface of the third lens to the imaging surface.

According to the various examples, the prism may have a parallelogram shape and include an incident surface on which the light is incident, first and second reflective surfaces changing the path of the light, and an emission surface from which the light is emitted. PL may be the sum of a distance between the incident surface and the first reflective surface on the optical axis, a distance between the first reflective surface and the second reflective surface on the optical axis, and a distance between the second reflective surface and the emission surface on the optical axis. In addition, TTL may be the sum of a distance between the object-side surface of the first lens and the first reflective surface on the optical axis, the distance between the first reflective surface and the second reflective surface on the optical axis, and a distance between the second reflective surface and the imaging surface on the optical axis, and BFL may be the sum of a distance between the image-side surface of the third lens and the first reflective surface on the optical axis, the distance between the first reflective surface and the second reflective surface on the optical axis, and the distance between the second reflective surface and the imaging surface on the optical axis.

Hereinafter, optical imaging systems according to various exemplary examples will be described.

Figure 2:
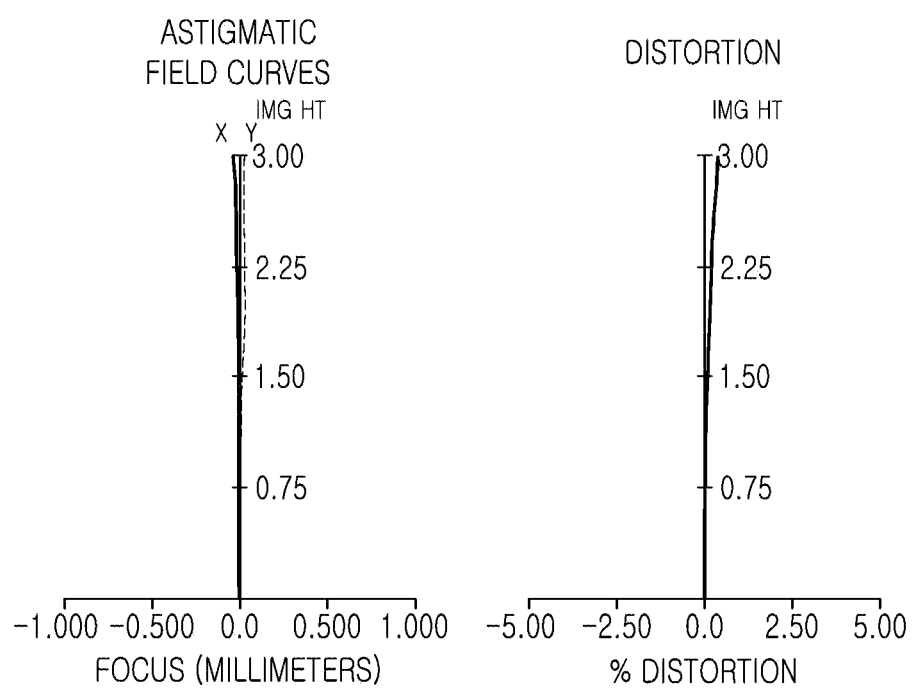
FIG. 2 illustrates aberration curves of the optical imaging system illustrated in FIG. 1.

First, an optical imaging system according to a first example will be described with reference to FIGS. 1 and 2.

An optical imaging system 100 according to the first example may include a first lens 110, a second lens 120, and a third lens 130 sequentially arranged from an object side.

The first lens 110 may have positive refractive power, and both surfaces thereof may be convex. For example, first and second surfaces of the first lens 110 may be convex in a paraxial region. The second lens 120 may have negative refractive power and may have a meniscus shape that is convex toward the object side. For example, a first surface of the second lens 120 may be convex in the paraxial region, and a second surface of the second lens 120 may be concave in the paraxial region. The third lens 130 may have positive refractive power and may have a meniscus shape that is convex toward the object side. For example, a first surface of the third lens 130 may be convex in the paraxial region, and a second surface of the third lens 130 may be concave in the paraxial region.

The optical imaging system 100 may include a lens formed of a plastic material. For example, all of the first to third lenses 110, 120, and 130 may be formed of a plastic material. Further, the first to third lenses 110, 120, and 130 may be formed of plastic materials having different optical characteristics. For example, Abbe numbers of the first to third lenses 110, 120, and 130 may be different from each other.

In addition, the optical imaging system 100 may include a stop (not illustrated), a prism P, an infrared cut-off filter 140, and an image sensor 150. For example, the stop may be disposed on an object side of the first lens 110. The prism P may be disposed between the third lens 130 and the infrared cut-off filter 140, and a path of light incident on the prism P may be changed twice in total.

Table 1 below illustrates characteristics of the optical imaging system 100, and Table 2 illustrates values of aspherical surfaces of the optical imaging system 100.

TABLE 1

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2* | First Lens | 4.847 | 2.555 | 1.54 | 55.7 |
| 3* | | −62.967 | 0.254 | | |

TABLE 1-continued

| Surface No. | Remark | Radius of Curvature | Thickness or Interval | Refractive Index | Abbe Number |
|---|---|---|---|---|---|
| 4* | Second Lens | 32.115 | 0.988 | 1.62 | 26.0 |
| 5* | | 4.258 | 0.216 | | |
| 6* | Third Lens | 8.198 | 0.346 | 1.68 | 19.2 |
| 7* | | 13.030 | 1.000 | | |
| 8 | Prism | Infinity | 2.500 | 1.519 | 64.2 |
| 9 | | Infinity | 11.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.091 | | |
| 14 | Imaging surface | Infinity | 0.009 | | |

(*aspherical surface)

TABLE 2

| Surface No. | 2 | 3 | 4 | 5 | 6 | 7 |
|---|---|---|---|---|---|---|
| K | 0.247 | −99.000 | 45.321 | 0.285 | −2.019 | 12.657 |
| A | 9.E−05 | −6.E−03 | −2.E−02 | −2.E−02 | −4.E−03 | 5.E−03 |
| B | 2.E−04 | 2.E−02 | 3.E−02 | 3.E−02 | 8.E−03 | −4.E−03 |
| C | −1.E−04 | −1.E−02 | −3.E−02 | −3.E−02 | −1.E−02 | 2.E−03 |
| D | 4.E−05 | 8.E−03 | 2.E−02 | 2.E−02 | 6.E−03 | −6.E−04 |
| E | −7.E−06 | −3.E−03 | −6.E−03 | −8.E−03 | −5.E−04 | 4.E−04 |
| F | 7.E−07 | 5.E−04 | 1.E−03 | 1.E−03 | −6.E−04 | −2.E−04 |
| G | −3.E−08 | −6.E−05 | −2.E−04 | −1.E−04 | 2.E−04 | 3.E−05 |
| H | −4.E−10 | 4.E−06 | 2.E−05 | −3.E−06 | −3.E−05 | −4.E−06 |
| J | 3.E−11 | −1.E−07 | −5.E−07 | 7.E−07 | 2.E−06 | 2.E−07 |

Figure 3:
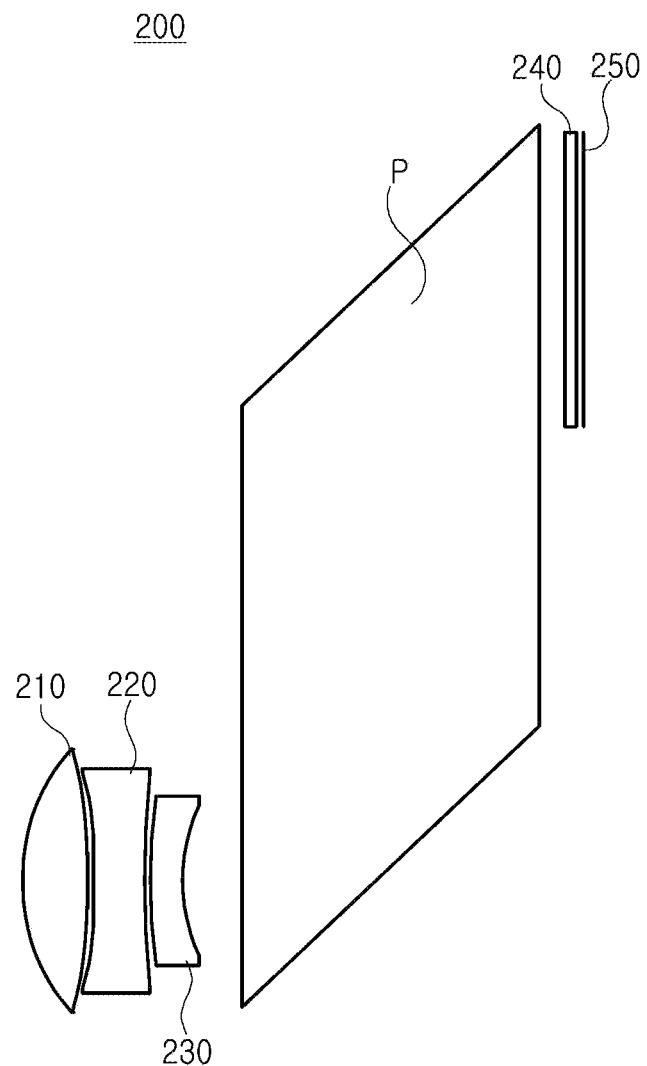
FIG. 3 is a diagram illustrating an optical imaging system according to a second example.
Figure 4:
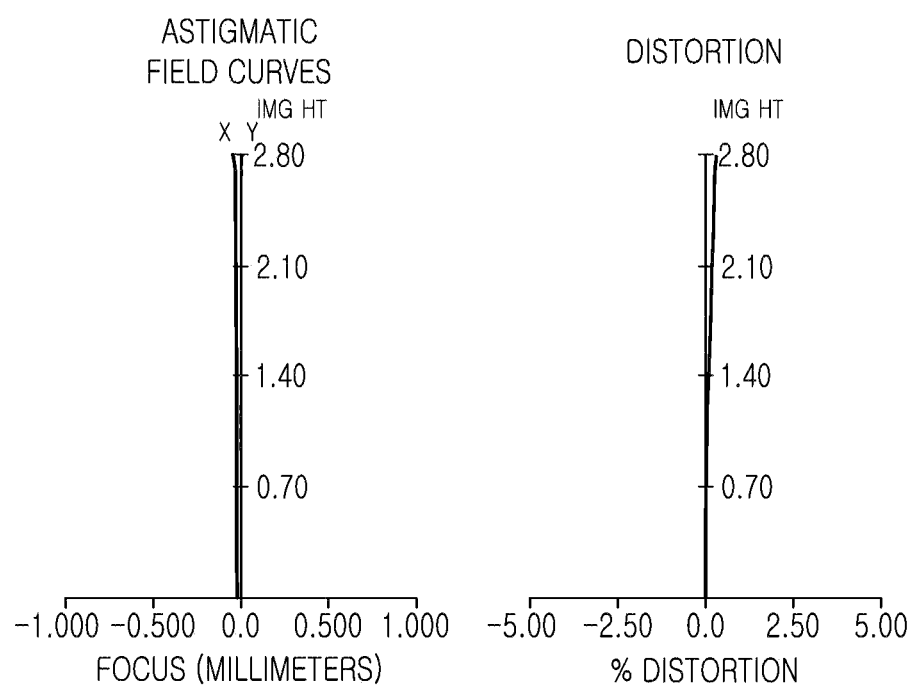
FIG. 4 illustrates aberration curves of the optical imaging system illustrated in FIG. 3.

Next, an optical imaging system according to a second example will be described with reference to FIGS. 3 and 4.

An optical imaging system 200 according to the second example may include a first lens 210, a second lens 220, and a third lens 230 sequentially arranged from the object side.

The first lens 210 may have positive refractive power, and both surfaces thereof may be convex. For example, first and second surfaces of the first lens 210 may be convex in a paraxial region. The second lens 220 may have negative refractive power, and both surfaces thereof may be concave. For example, first and second surfaces of the second lens 220 may be concave in the paraxial region. The third lens 230 may have negative refractive power and may have a meniscus shape that is convex toward the object side. For example, a first surface of the third lens 230 may be convex in the paraxial region, and a second surface of the third lens 230 may be concave in the paraxial region.

The optical imaging system 200 may include a lens formed of a plastic material. For example, all of the first to third lenses 210, 220, and 230 may be formed of a plastic material. Further, according to the second example, at least some of the first to third lenses 210, 220, and 230 may be formed of plastic materials having different optical characteristics. For example, an Abbe number of the third lens 230 may be different from those of the first lens 210 and the second lens 220.

In addition, the optical imaging system 200 may include a stop (not illustrated), a prism P, an infrared cut-off filter 240, and an image sensor 250. For example, the stop may be disposed on an object side of the first lens 210. The prism P may be disposed between the third lens 230 and the infrared cut-off filter 240, and a path of light incident on the prism P may be changed twice in total.

Table 3 below illustrates characteristics of the optical imaging system 200, and Table 4 illustrates values of aspherical surfaces of the optical imaging system 200.

TABLE 3

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2* | First Lens | 4.011 | 1.214 | 1.54 | 55.7 |
| 3* | | −12.748 | 0.100 | | |
| 4* | Second Lens | −10.941 | 0.925 | 1.54 | 55.7 |
| 5* | | 58.696 | 0.100 | | |
| 6* | Third Lens | 8.691 | 0.609 | 1.62 | 26.0 |
| 7* | | 3.678 | 1.000 | | |
| 8 | Prism | Infinity | 2.500 | 1.519 | 64.2 |
| 9 | | Infinity | 11.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.085 | | |
| 14 | Imaging surface | Infinity | 0.015 | | |

(*aspherical surface)

TABLE 4

| Surface No. | 2 | 3 | 4 | 5 | 6 | 7 |
|---|---|---|---|---|---|---|
| K | 0.303 | 0.000 | 0.000 | −99.000 | −12.268 | 0.507 |
| A | 1.E−04 | −2.E−06 | 4.E−06 | −5.E−03 | −1.E−02 | −6.E−03 |
| B | 2.E−04 | −8.E−06 | 8.E−06 | 2.E−02 | 1.E−02 | −6.E−03 |
| C | −9.E−05 | −2.E−06 | 2.E−06 | −1.E−02 | −7.E−03 | 2.E−02 |
| D | 3.E−05 | −4.E−07 | 4.E−07 | 8.E−03 | −2.E−03 | −4.E−02 |
| E | −7.E−06 | −4.E−08 | 2.E−08 | −3.E−03 | 4.E−03 | 3.E−02 |
| F | 5.E−07 | −1.E−09 | −3.E−09 | 5.E−04 | −2.E−03 | −2.E−02 |
| G | −1.E−08 | −2.E−10 | 1.E−09 | −6.E−05 | 6.E−04 | 4.E−03 |
| H | 2.E−08 | −3.E−10 | 2.E−09 | 3.E−06 | −7.E−05 | −7.E−04 |
| J | −4.E−09 | −2.E−10 | 7.E−10 | 1.E−07 | 3.E−06 | 4.E−05 |

Figure 5:
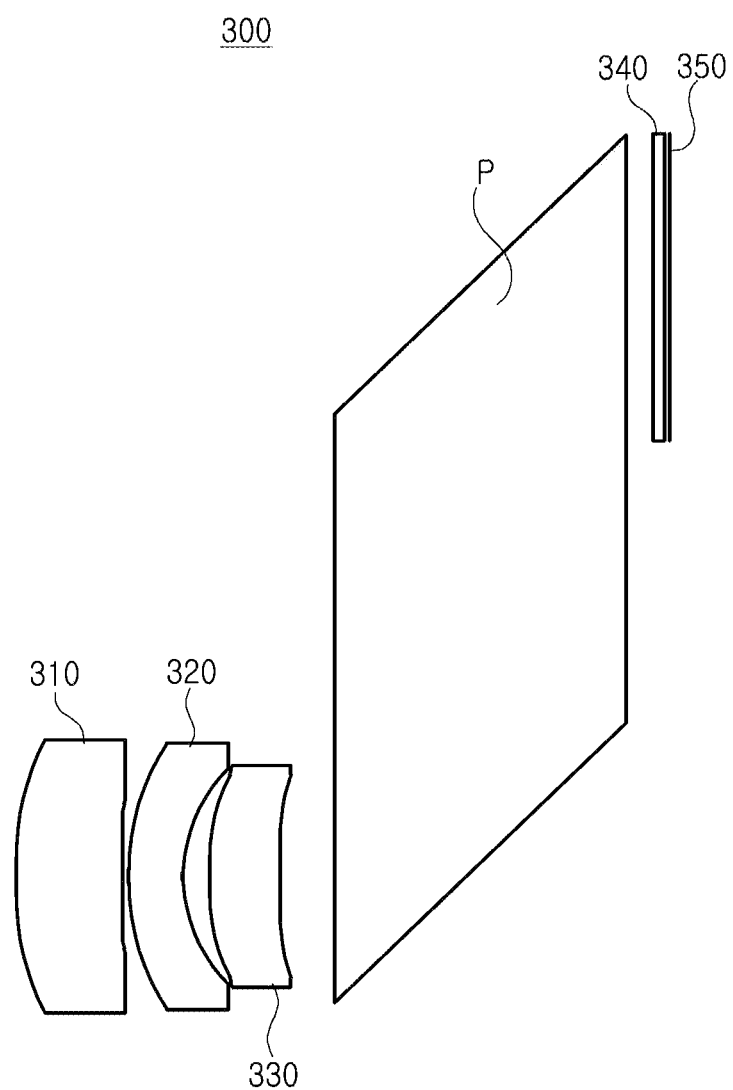
FIG. 5 is a diagram illustrating an optical imaging system according to a third example.
Figure 6:
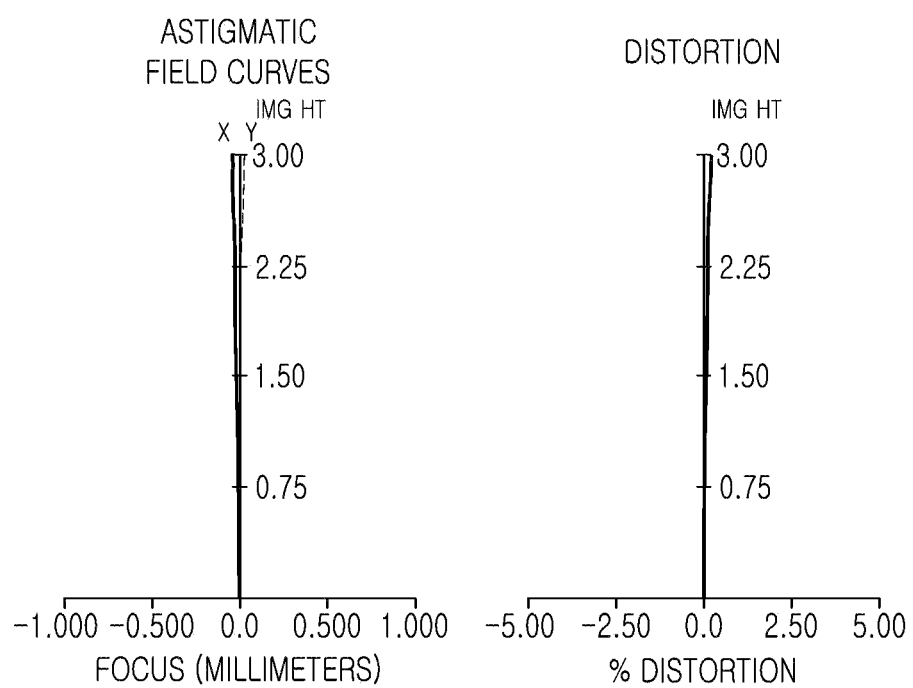
FIG. 6 illustrates aberration curves of the optical imaging system illustrated in FIG. 5.

An optical imaging system according to a third example will be described with reference to FIGS. 5 and 6.

An optical imaging system 300 according to the third example may include a first lens 310, a second lens 320, and a third lens 330 sequentially arranged from the object side.

The first lens 310 may have positive refractive power and may have a meniscus shape that is convex toward the object side. For example, a first surface of the first lens 310 may be convex in the paraxial region, and a second surface of the first lens 310 may be concave in the paraxial region. The second lens 320 may have negative refractive power and may have a meniscus shape that is convex toward the object side. For example, a first surface of the second lens 320 may be convex in the paraxial region, and a second surface of the second lens 320 may be concave in the paraxial region. The third lens 330 may have positive refractive power and may have a meniscus shape that is convex toward the object side. For example, a first surface of the third lens 330 may be convex in the paraxial region, and a second surface of the third lens 330 may be concave in the paraxial region.

The optical imaging system 300 may include a lens formed of a plastic material. For example, the first and second lenses 310 and 320 may be formed of a plastic material, and the third lens 330 may be formed of a glass material. Further, according to the third example, the first and second lenses 310 and 320 may be formed of plastic materials having different optical characteristics. For example, Abbe numbers of the first lens 310 and the second lens 320 may be different from each other.

In addition, the optical imaging system 300 may include a stop (not illustrated), a prism P, an infrared cut-off filter 340, and an image sensor 350. For example, the stop may be disposed on an image side of the second lens 320. The prism P may be disposed between the third lens 330 and the infrared cut-off filter 340, and a path of light incident on the prism P may be changed twice in total.

Table 5 below illustrates characteristics of the optical imaging system 300, and Table 6 illustrates values of aspherical surfaces of the optical imaging system 300.

TABLE 5

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2* | First Lens | 6.630 | 2.000 | 1.537 | 55.7 |
| 3* | | 73.378 | 0.111 | | |
| 4* | Second Lens | 4.587 | 1.000 | 1.620 | 25.9 |
| 5* | | 2.711 | 0.500 | | |
| 6 | Third Lens | 5.433 | 1.295 | 1.498 | 81.6 |
| 7 | | 9.469 | 1.000 | | |
| 8 | Prism | Infinity | 2.500 | 1.519 | 64.2 |

TABLE 5-continued

| Surface No. | Remark | Radius of Curvature | Thickness or Interval | Refractive Index | Abbe Number |
|---|---|---|---|---|---|
| 9 | | Infinity | 11.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.097 | | |
| 14 | Imaging surface | Infinity | 0.003 | | |

(*aspherical surface)

TABLE 6

| Surface No. | 2 | 3 | 4 | 5 | 6 | 7 |
|---|---|---|---|---|---|---|
| K | −0.408 | 86.522 | −0.913 | −0.675 | 0.000 | 0.000 |
| A | −3.E−04 | 5.E−05 | −4.E−04 | −1.E−03 | 0.000 | 0.000 |
| B | 1.E−05 | −4.E−06 | −6.E−05 | −1.E−04 | 0.000 | 0.000 |
| C | 0.000 | 0.000 | 0.000 | 0.000 | 0.000 | 0.000 |
| D | 0.000 | 0.000 | 0.000 | 0.000 | 0.000 | 0.000 |
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

Figure 7:
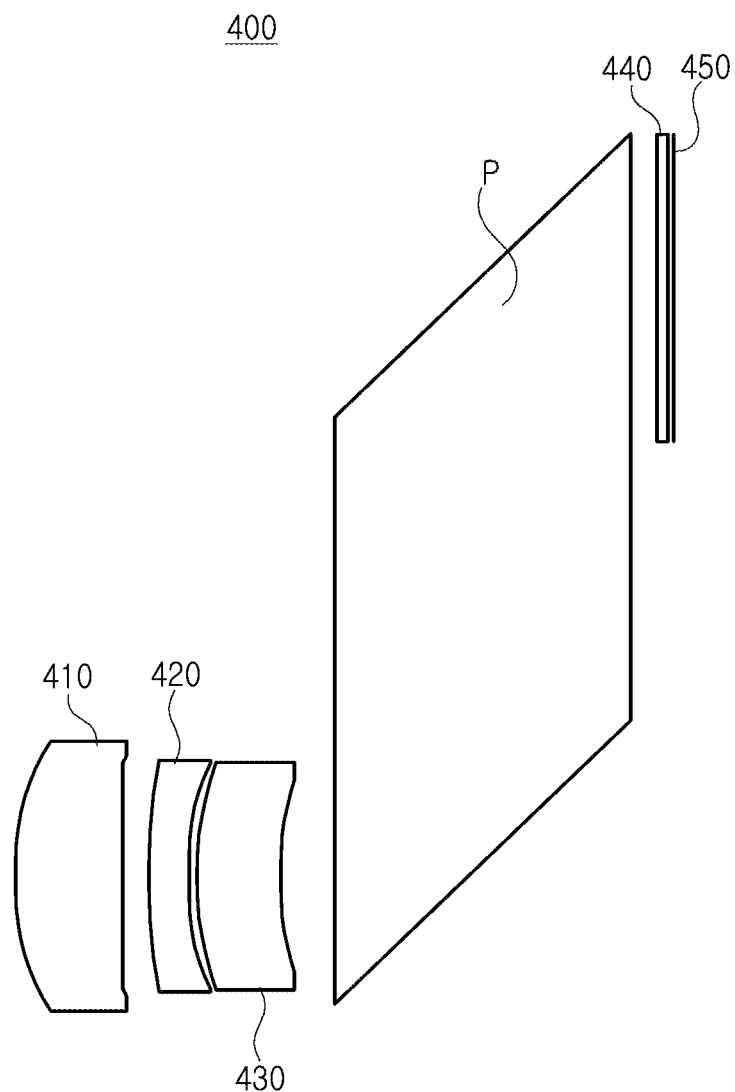
FIG. 7 is a diagram illustrating an optical imaging system according to a fourth example.
Figure 8:
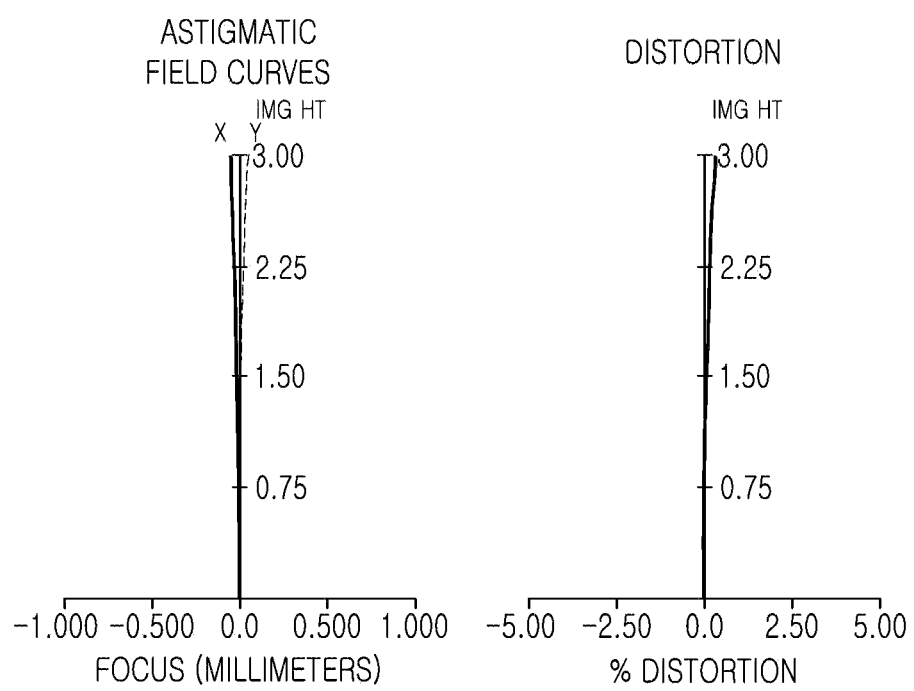
FIG. 8 illustrates aberration curves of the optical imaging system illustrated in FIG. 7.

An optical imaging system according to a fourth example will be described with reference to FIGS. 7 and 8.

An optical imaging system 400 according to the fourth example may include a first lens 410, a second lens 420, and a third lens 430 sequentially arranged from the object side.

The first lens 410 may have positive refractive power and may have a meniscus shape that is convex toward the object side. For example, a first surface of the first lens 410 may be convex in the paraxial region, and a second surface of the first lens 410 may be concave in the paraxial region. The second lens 420 may have negative refractive power and may have a meniscus shape that is convex toward the object side. For example, a first surface of the second lens 420 may be convex in the paraxial region, and a second surface of the second lens 420 may be concave in the paraxial region. The third lens 430 may have positive refractive power and may have a meniscus shape that is convex toward the object side. For example, a first surface of the third lens 430 may be convex in the paraxial region, and a second surface of the third lens 430 may be concave in the paraxial region.

The optical imaging system 400 may include a lens formed of a plastic material. For example, the first lens 410 may be formed of a glass material, and the second and third lenses 420 and 430 may be formed of a plastic material. Further, according to the fourth example, the second and third lenses 420 and 430 may be formed of plastic materials having different optical characteristics. For example, Abbe numbers of the second lens 420 and the third lens 430 may be different from each other.

In addition, the optical imaging system 400 may include a stop (not illustrated), a prism P, an infrared cut-off filter 440, and an image sensor 450. For example, the stop may be disposed on an object side of the first lens 410. The prism P may be disposed between the third lens 430 and the infrared cut-off filter 440, and a path of light incident on the prism P may be changed twice in total.

Table 7 below illustrates characteristics of the optical imaging system 400, and Table 8 illustrates values of aspherical surfaces of the optical imaging system 400.

TABLE 7

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2 | First Lens | 5.513 | 2.000 | 1.498 | 81.6 |
| 3 | | 58.302 | 0.500 | | |
| 4* | Second Lens | 16.160 | 0.737 | 1.620 | 25.9 |
| 5* | | 6.717 | 0.173 | | |
| 6* | Third Lens | 8.479 | 1.562 | 1.677 | 19.2 |
| 7* | | 8.849 | 1.000 | | |
| 8 | Prism | Infinity | 2.500 | 1.519 | 64.2 |
| 9 | | Infinity | 11.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.100 | | |
| 14 | Imaging surface | Infinity | 0.000 | | |

(*aspherical surface)

TABLE 8

| Surface No. | 2 | 3 | 4 | 5 | 6 | 7 |
|---|---|---|---|---|---|---|
| K | 0.000 | 0.000 | 12.825 | 0.813 | 2.284 | 7.525 |
| A | 0.000 | 0.000 | −3.E−04 | 7.E−04 | 6.E−04 | 3.E−04 |
| B | 0.000 | 0.000 | −3.E−05 | 2.E−04 | 2.E−04 | −8.E−05 |
| C | 0.000 | 0.000 | 0.000 | 0.000 | 0.000 | 0.000 |
| D | 0.000 | 0.000 | 0.000 | 0.000 | 0.000 | 0.000 |

TABLE 8-continued

| Surface No. | 2 | 3 | 4 | 5 | 6 | 7 |
|---|---|---|---|---|---|---|
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

Figure 9:
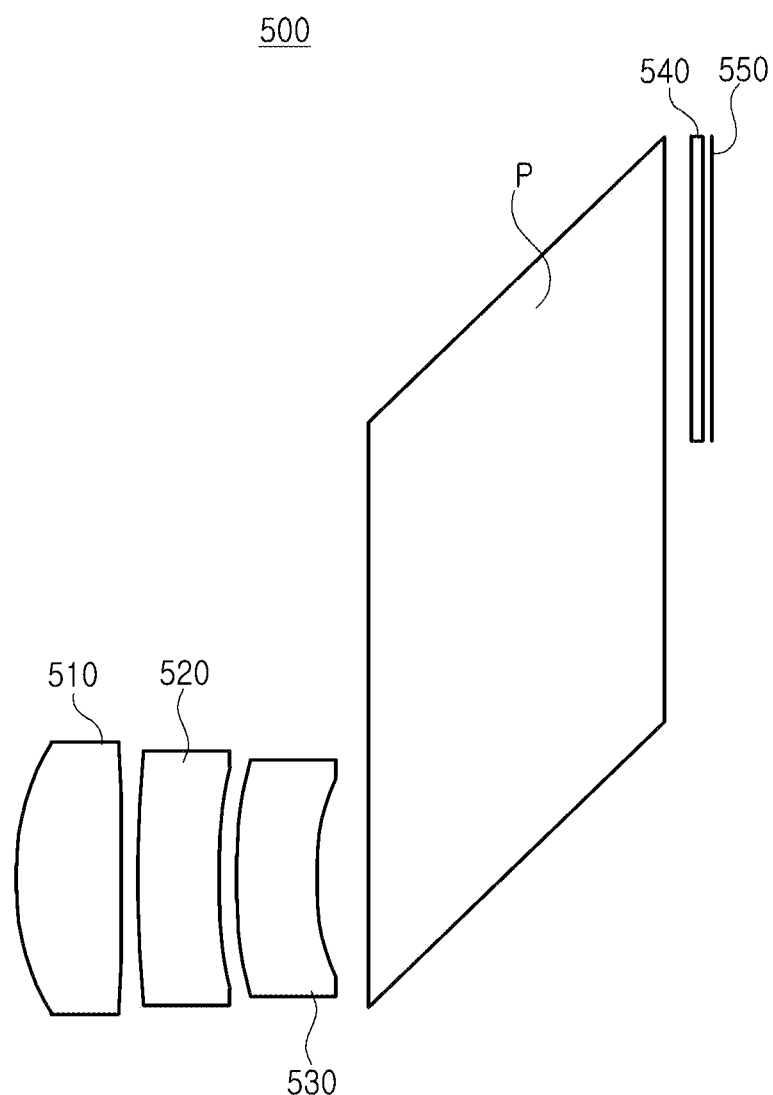
FIG. 9 is a diagram illustrating an optical imaging system according to a fifth example.
Figure 10:
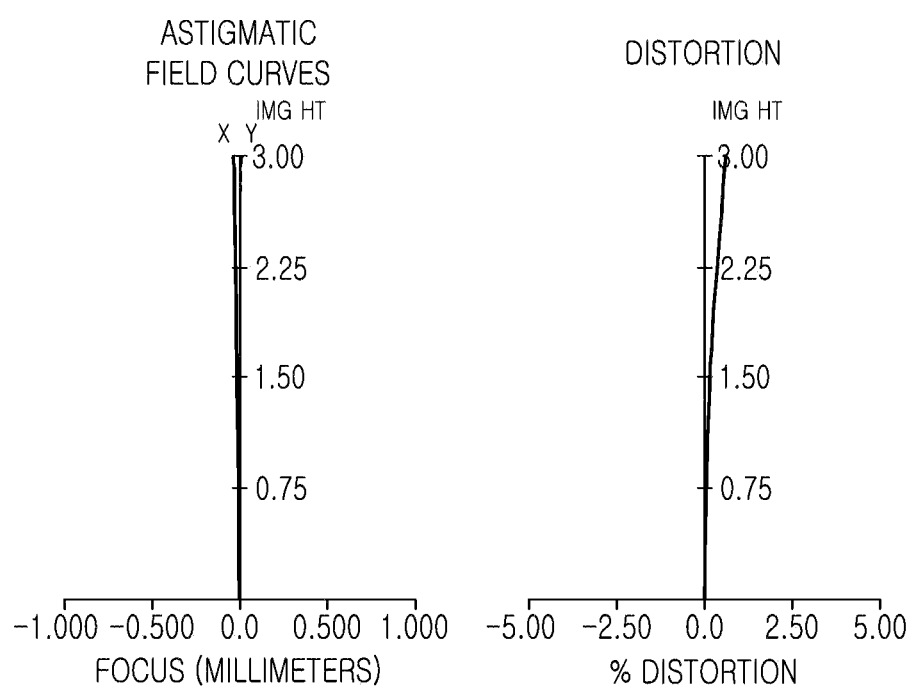
FIG. 10 illustrates aberration curves of the optical imaging system illustrated in FIG. 9.

An optical imaging system according to a fifth example will be described with reference to FIGS. 9 and 10.

An optical imaging system 500 according to the fifth example may include a first lens 510, a second lens 520, and a third lens 530 sequentially arranged from the object side.

The first lens 510 may have positive refractive power, and both surfaces thereof may be convex. For example, first and second surfaces of the first lens 510 may be convex in a paraxial region. The second lens 520 may have negative refractive power and may have a meniscus shape that is convex toward the object side. For example, a first surface of the second lens 520 may be convex in the paraxial region, and a second surface of the second lens 520 may be concave in the paraxial region. The third lens 530 may have negative refractive power and may have a meniscus shape that is convex toward the object side. For example, a first surface of the third lens 530 may be convex in the paraxial region, and a second surface of the third lens 530 may be concave in the paraxial region.

The optical imaging system 500 may include a lens formed of a plastic material. For example, the first and second lenses 510 and 520 may be formed of a glass material, and the third lens 530 may be formed of a plastic material.

In addition, the optical imaging system 500 may include a stop (not illustrated), a prism P, an infrared cut-off filter 540, and an image sensor 550. For example, the stop may be disposed on an object side of the first lens 510. The prism P may be disposed between the third lens 530 and the infrared cut-off filter 540, and a path of light incident on the prism P may be changed twice in total.

Table 9 below illustrates characteristics of the optical imaging system 500, and Table 10 illustrates values of aspherical surfaces of the optical imaging system 500.

TABLE 9

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2 | First Lens | 5.433 | 2.000 | 1.466 | 65.8 |
| 3 | | −61.577 | 0.300 | | |
| 4 | Second Lens | 32.632 | 1.500 | 1.630 | 35.7 |
| 5 | | 12.564 | 0.300 | | |
| 6* | Third Lens | 8.968 | 1.500 | 1.646 | 23.5 |
| 7* | | 5.248 | 1.000 | | |
| 8 | Prism | Infinity | 2.500 | 1.519 | 64.2 |
| 9 | | Infinity | 11.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.200 | | |
| 14 | Imaging surface | Infinity | 0.000 | | |

(*aspherical surface)

TABLE 10

| Surface No. | 2 | 3 | 4 | 5 | 6 | 7 |
|---|---|---|---|---|---|---|
| K | 0.000 | 0.000 | 0.000 | 0.000 | −3.928 | 0.849 |
| A | 0.000 | 0.000 | 0.000 | 0.000 | −6.E−04 | −1.E−03 |
| B | 0.000 | 0.000 | 0.000 | 0.000 | −6.E−05 | −5.E−05 |
| C | 0.000 | 0.000 | 0.000 | 0.000 | 0.000 | 0.000 |
| D | 0.000 | 0.000 | 0.000 | 0.000 | 0.000 | 0.000 |
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

Figure 11:
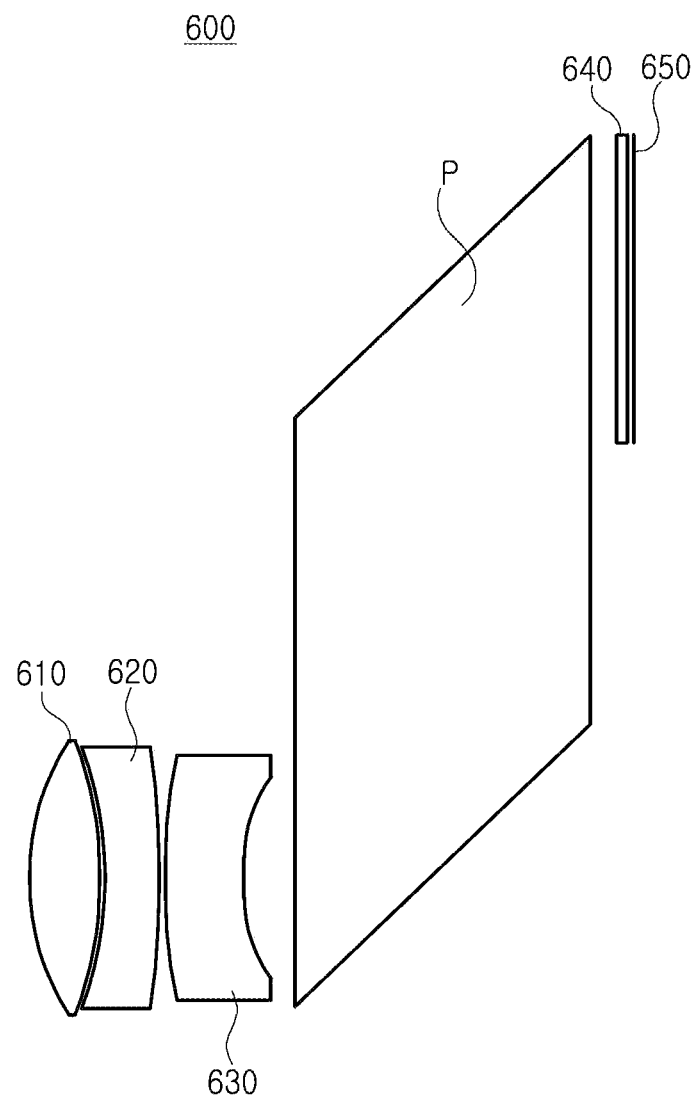
FIG. 11 is a diagram illustrating an optical imaging system according to a sixth example.
Figure 12:
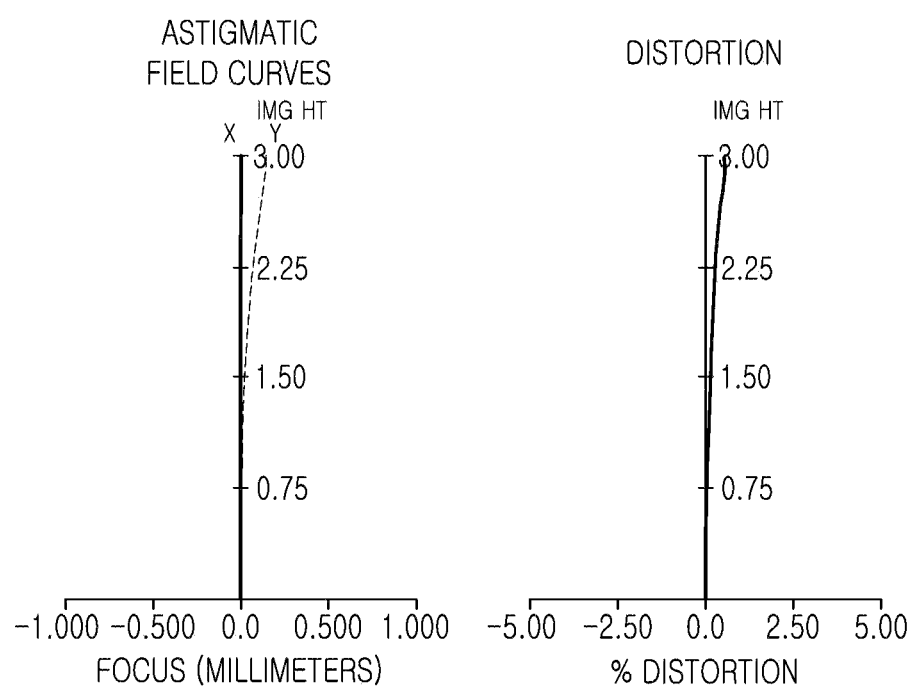
FIG. 12 illustrates aberration curves of the optical imaging system illustrated in FIG. 11.

Next, an optical imaging system according to a sixth example will be described with reference to FIGS. 11 and 12.

An optical imaging system 600 according to the sixth example may include a first lens 610, a second lens 620, and a third lens 630 sequentially arranged from the object side.

The first lens 610 may have positive refractive power, and both surfaces thereof may be convex. For example, first and second surfaces of the first lens 610 may be convex in a paraxial region. The second lens 620 may have negative refractive power and may have a meniscus shape in which it is convex toward the image. For example, a first surface of the second lens 620 may be concave in the paraxial region, and a second surface of the second lens 620 may be convex in the paraxial region. The third lens 630 may have negative refractive power and may have a meniscus shape that is convex toward the object side. For example, a first surface of the third lens 630 may be convex in the paraxial region, and a second surface of the third lens 630 may be concave in the paraxial region.

The optical imaging system 600 may include a lens formed of a plastic material. For example, the first lens 610 may be formed of a plastic material, and the second and third lenses 620 and 630 may be formed of a glass material.

In addition, the optical imaging system 600 may include a stop (not illustrated), a prism P, an infrared cut-off filter 640, and an image sensor 650. For example, the stop may be disposed on an object side of the first lens 610. The prism P may be disposed between the third lens 630 and the infrared cut-off filter 640, and a path of light incident on the prism P may be changed twice in total.

Table 11 below illustrates characteristics of the optical imaging system 600, and Table 12 illustrates values of aspherical surfaces of the optical imaging system 600.

TABLE 11

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2* | First Lens | 5.243 | 1.319 | 1.537 | 55.7 |
| 3* | | −7.598 | 0.102 | | |
| 4 | Second Lens | −7.613 | 1.000 | 1.630 | 35.7 |
| 5 | | −20.207 | 0.100 | | |
| 6 | Third Lens | 11.774 | 1.456 | 1.630 | 35.7 |
| 7 | | 3.877 | 1.000 | | |
| 8 | Prism | Infinity | 2.500 | 1.519 | 64.2 |
| 9 | | Infinity | 11.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.097 | | |
| 14 | Imaging surface | Infinity | 0.003 | | |

(*aspherical surface)

TABLE 12

| Surface No. | 2 | 3 | 4 | 5 | 6 | 7 |
|---|---|---|---|---|---|---|
| K | −0.211 | −0.879 | 0.000 | 0.000 | 0.000 | 0.000 |
| A | −2.E−04 | 2.E−04 | 0.000 | 0.000 | 0.000 | 0.000 |
| B | 9.E−08 | −1.E−05 | 0.000 | 0.000 | 0.000 | 0.000 |
| C | 0.000 | 0.000 | 0.000 | 0.000 | 0.000 | 0.000 |
| D | 0.000 | 0.000 | 0.000 | 0.000 | 0.000 | 0.000 |
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

Figure 13:
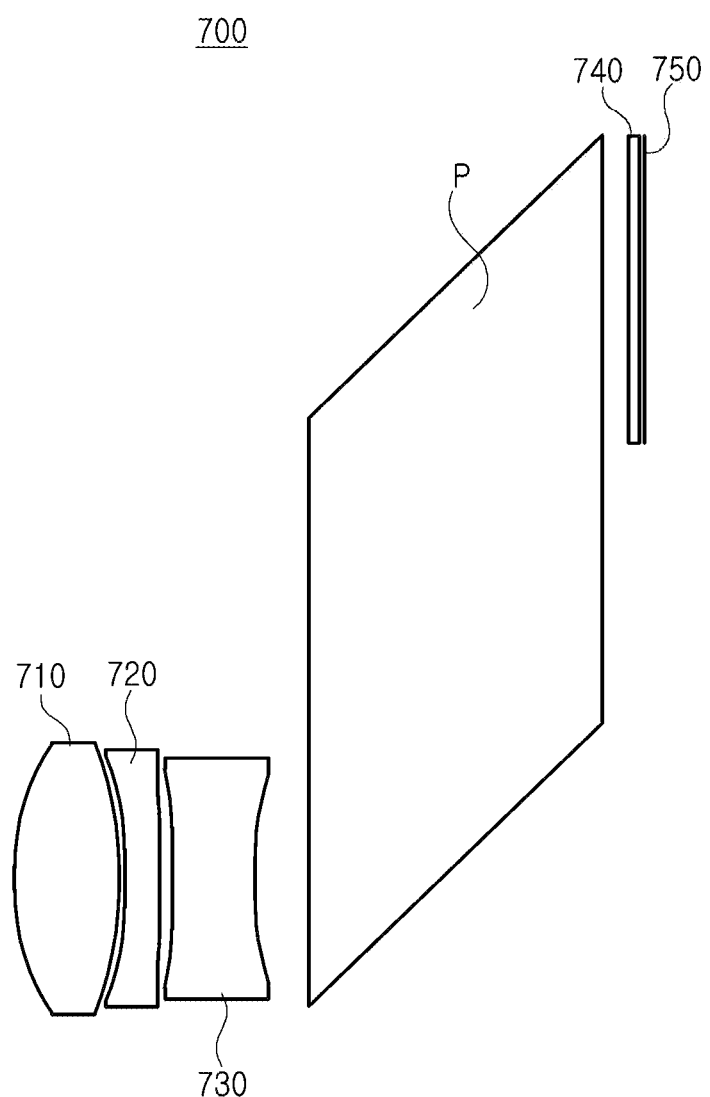
FIG. 13 is a diagram illustrating an optical imaging system according to a seventh example.
Figure 14:
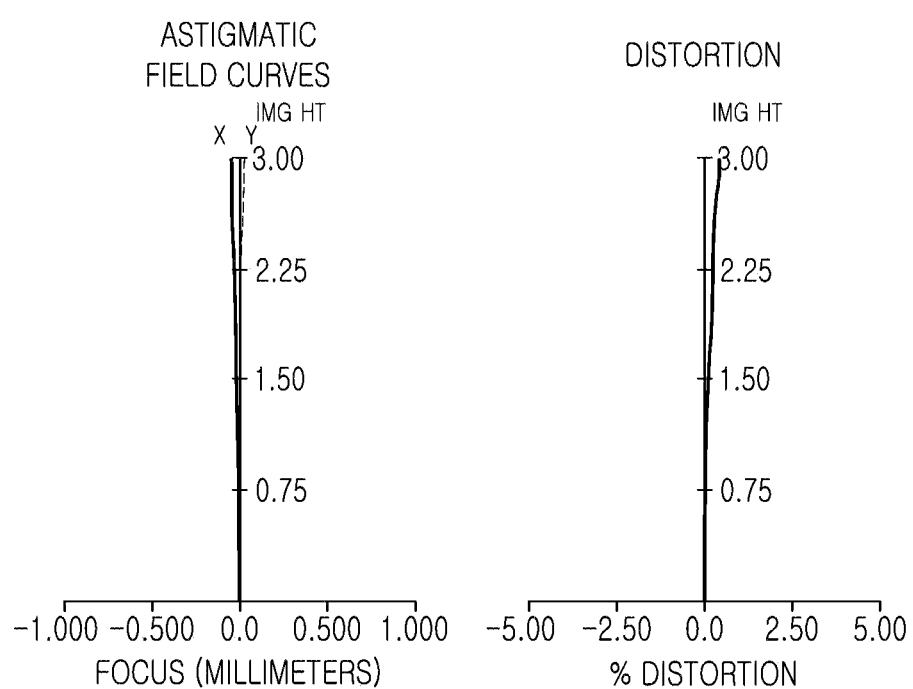
FIG. 14 illustrates aberration curves of the optical imaging system illustrated in FIG. 13.

Next, an optical imaging system according to a seventh example will be described with reference to FIGS. 13 and 14.

An optical imaging system 700 according to the seventh example may include a first lens 710, a second lens 720, and a third lens 730 sequentially arranged from the object side.

The first lens 710 may have positive refractive power, and both surfaces thereof may be convex. For example, first and second surfaces of the first lens 710 may be convex in a paraxial region. The second lens 720 may have negative refractive power and may have a meniscus shape convex toward the image. For example, a first surface of the second lens 720 may be concave in the paraxial region, and a second surface of the second lens 720 may be convex in the paraxial region. The third lens 730 may have negative refractive power, and both surfaces thereof may be concave. For example, first and second surfaces of the third lens 730 may be concave in the paraxial region.

The optical imaging system 700 may include a lens formed of a plastic material. For example, all of the first to third lenses 710, 720, and 730 may be formed of a plastic material. Further, according to the seventh example, at least some of the first to third lenses 710, 720, and 730 may be formed of plastic materials having different optical characteristics. For example, an Abbe number of the first lens 710 may be different from those of the second lens 720 and the third lens 730.

In addition, the optical imaging system 700 may include a stop (not illustrated), a prism P, an infrared cut-off filter 740, and an image sensor 750. For example, the stop may be disposed on an object side of the first lens 710. The prism P may be disposed between the third lens 730 and the infrared cut-off filter 740, and a path of light incident on the prism P may be changed twice in total.

Table 13 below illustrates characteristics of the optical imaging system 700, and Table 14 illustrates values of aspherical surfaces of the optical imaging system 700.

TABLE 13

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2* | First Lens | 5.066 | 0.200 | 1.537 | 55.7 |
| 3* | | −6.667 | 0.100 | | |
| 4* | Second Lens | −8.208 | 0.663 | 1.571 | 37.4 |

TABLE 13-continued

| Surface No. | Remark | Radius of Curvature | Thickness or Interval | Refractive Index | Abbe Number |
|---|---|---|---|---|---|
| 5* | | −30.077 | 0.263 | | |
| 6* | Third Lens | −9.136 | 1.491 | 1.571 | 37.4 |
| 7* | | 12.243 | 1.000 | | |
| 8 | Prism | Infinity | 2.500 | 1.519 | 64.2 |
| 9 | | Infinity | 11.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.096 | | |
| 14 | Imaging surface | Infinity | 0.004 | | |

(*aspherical surface)

TABLE 14

| Surface No. | 2 | 3 | 4 | 5 | 6 | 7 |
|---|---|---|---|---|---|---|
| K | −0.239 | 0.749 | 4.251 | 58.723 | −13.033 | 6.220 |
| A | 3.E−04 | 2.E−03 | −3.E−04 | −4.E−04 | 4.E−03 | 5.E−03 |
| B | 1.E−05 | 8.E−05 | 4.E−04 | 4.E−04 | −4.E−05 | −8.E−05 |
| C | 0.000 | 0.000 | 0.000 | 0.000 | 0.000 | 0.000 |
| D | 0.000 | 0.000 | 0.000 | 0.000 | 0.000 | 0.000 |
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

Figure 15:
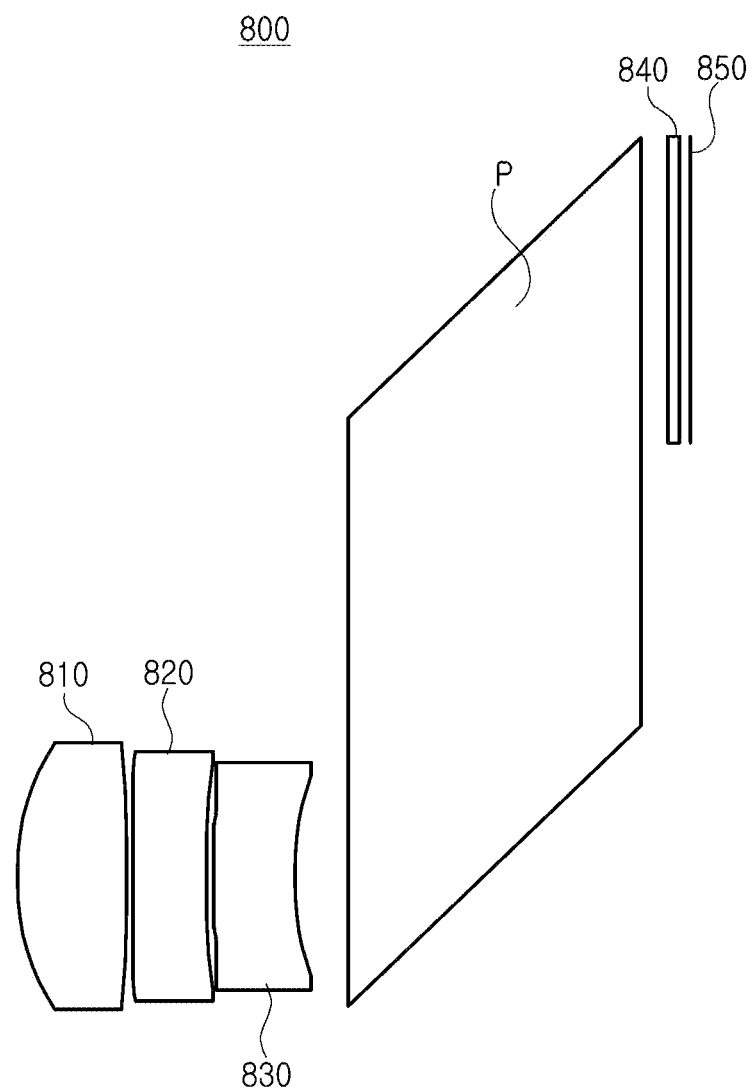
FIG. 15 is a diagram illustrating an optical imaging system according to an eighth example.
Figure 16:
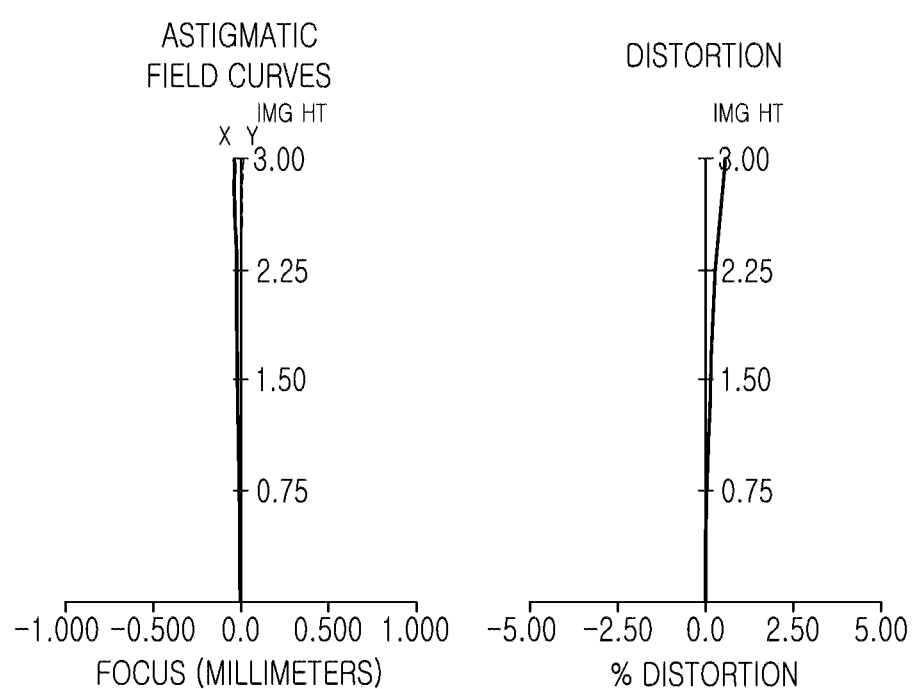
FIG. 16 illustrates aberration curves of the optical imaging system illustrated in FIG. 15.

An optical imaging system according to an eighth example will be described with reference to FIGS. 15 and 16.

An optical imaging system 800 according to the eighth example may include a first lens 810, a second lens 820, and a third lens 830 sequentially arranged from the object side.

The first lens 810 may have positive refractive power, and both surfaces thereof may be convex. For example, first and second surfaces of the first lens 810 may be convex in the paraxial region. The second lens 820 may have negative refractive power, and both surfaces thereof may be concave. For example, first and second surfaces of the second lens 820 may be concave in the paraxial region. The third lens 830 may have negative refractive power and may have a meniscus shape that is convex toward the object side. For example, a first surface of the third lens 830 may be convex in the paraxial region, and a second surface of the third lens 830 may be concave in the paraxial region.

The optical imaging system 800 may include a lens formed of a plastic material. For example, all of the first to third lenses 810, 820, and 830 may be formed of a plastic material. Further, according to the eighth example, at least some of the first to third lenses 810, 820, and 830 may be formed of plastic materials having different optical characteristics. For example, an Abbe number of the third lens 830 may be different from those of the first lens 810 and the second lens 820.

In addition, the optical imaging system 800 may include a stop (not illustrated), a prism P, an infrared cut-off filter 840, and an image sensor 850. For example, the stop may be disposed on an object side of the third lens 830. The prism P may be disposed between the third lens 830 and the infrared cut-off filter 840, and a path of light incident on the prism P may be changed twice in total.

Table 15 below illustrates characteristics of the optical imaging system 800, and Table 16 illustrates values of aspherical surfaces of the optical imaging system 800.

TABLE 15

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2* | First Lens | 5.921 | 0.200 | 1.537 | 55.7 |
| 3* | | −15.418 | 0.100 | | |
| 4* | Second Lens | −1248.125 | 1.367 | 1.537 | 55.7 |
| 5* | | 16.994 | 0.163 | | |
| 6* | Third Lens | 67.177 | 1.500 | 1.646 | 23.5 |
| 7* | | 7.765 | 1.000 | | |
| 8 | Prism | Infinity | 2.500 | 1.519 | 64.2 |
| 9 | | Infinity | 11.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.196 | | |
| 14 | Imaging surface | Infinity | 0.004 | | |

(*aspherical surface)

TABLE 16

| Surface No. | 2 | 3 | 4 | 5 | 6 | 7 |
|---|---|---|---|---|---|---|
| K | −0.128 | 7.933 | −99.000 | 10.022 | 99.000 | −0.580 |
| A | 1.E−04 | 2.E−03 | 8.E−05 | −3.E−03 | 1.E−03 | 4.E−03 |
| B | 8.E−06 | 7.E−05 | 3.E−04 | 4.E−04 | −9.E−05 | −2.E−04 |
| C | 0.000 | 0.000 | 0.000 | 0.000 | 0.000 | 0.000 |
| D | 0.000 | 0.000 | 0.000 | 0.000 | 0.000 | 0.000 |
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

Figure 17:
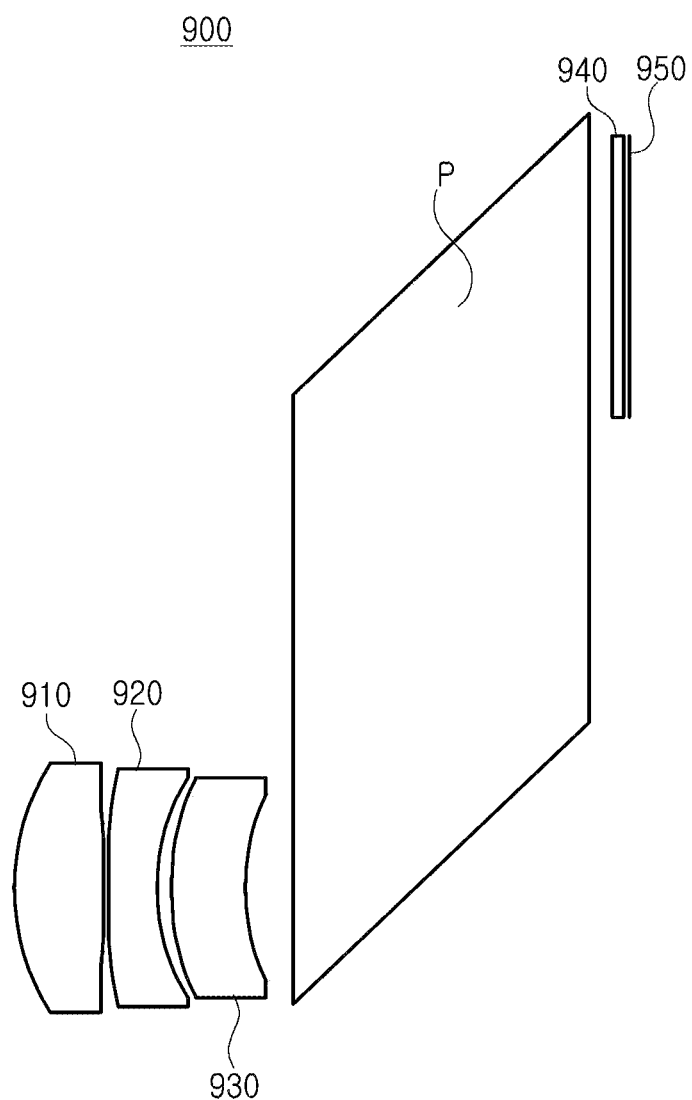
FIG. 17 is a diagram illustrating an optical imaging system according to a ninth example.
Figure 18:
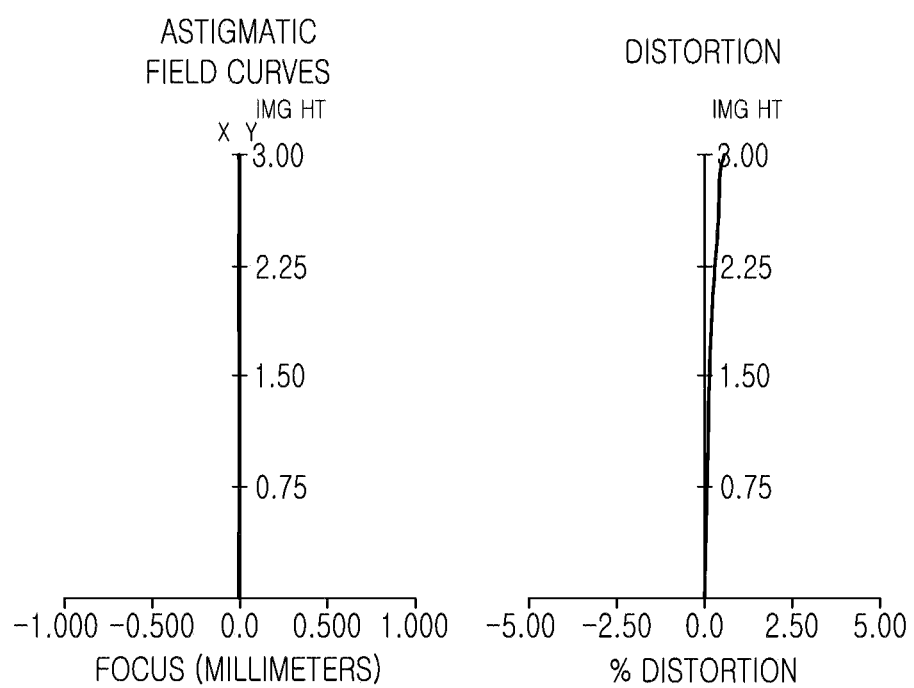
FIG. 18 illustrates aberration curves of the optical imaging system illustrated in FIG. 17.

An optical imaging system according to a ninth example will be described with reference to FIGS. 17 and 18.

An optical imaging system 900 according to the ninth example may include a first lens 910, a second lens 920, and a third lens 930 sequentially arranged from the object side.

The first lens 910 may have positive refractive power, and both surfaces thereof may be convex. For example, first and second surfaces of the first lens 910 may be convex in the paraxial region. The second lens 920 may have negative refractive power and may have a meniscus shape that is convex toward the object side. For example, a first surface of the second lens 920 may be convex in the paraxial region, and a second surface of the second lens 920 may be concave in the paraxial region. The third lens 930 may have negative refractive power and may have a meniscus shape that is convex toward the object side. For example, a first surface of the third lens 930 may be convex in the paraxial region, and a second surface of the third lens 930 may be concave in the paraxial region.

The optical imaging system 900 may include a lens formed of a plastic material. For example, the first lens 910 may be formed of a glass material, and the second and third lenses 920 and 930 may be formed of a plastic material. Further, according to the ninth example, the second and third lenses 920 and 930 may be formed of plastic materials having different optical characteristics. For example, Abbe numbers of the second lens 920 and the third lens 930 may be different from each other.

In addition, the optical imaging system 900 may include a stop (not illustrated), a prism P, an infrared cut-off filter 940, and an image sensor 950. For example, the stop may be disposed on an image side of the second lens 920. The prism P may be disposed between the third lens 930 and the infrared cut-off filter 940, and a path of light incident on the prism P may be changed twice in total.

Table 17 below illustrates characteristics of the optical imaging system 900, and Table 18 illustrates values of aspherical surfaces of the optical imaging system 900.

TABLE 17

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2 | First Lens | 5.238 | 1.794 | 1.498 | 81.6 |
| 3 | | −76.751 | 0.100 | | |
| 4* | Second Lens | 18.184 | 1.016 | 1.571 | 37.4 |
| 5* | | 5.789 | 0.250 | | |
| 6* | Third Lens | 5.348 | 1.500 | 1.668 | 20.4 |
| 7* | | 4.230 | 1.000 | | |
| 8 | Prism | Infinity | 2.500 | 1.519 | 64.2 |
| 9 | | Infinity | 11.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.096 | | |
| 14 | Imaging surface | Infinity | 0.004 | | |

(*aspherical surface)

TABLE 18

| Surface No. | 2 | 3 | 4 | 5 | 6 | 7 |
|---|---|---|---|---|---|---|
| K | 0.000 | 0.000 | −1.871 | 1.283 | −0.265 | −1.417 |
| A | 0.000 | 0.000 | 1.E−03 | 2.E−03 | −2.E−04 | 8.E−04 |
| B | 0.000 | 0.000 | −6.E−05 | 2.E−05 | 2.E−05 | −3.E−05 |
| C | 0.000 | 0.000 | 0.000 | 0.000 | 0.000 | 0.000 |
| D | 0.000 | 0.000 | 0.000 | 0.000 | 0.000 | 0.000 |
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

Figure 19:
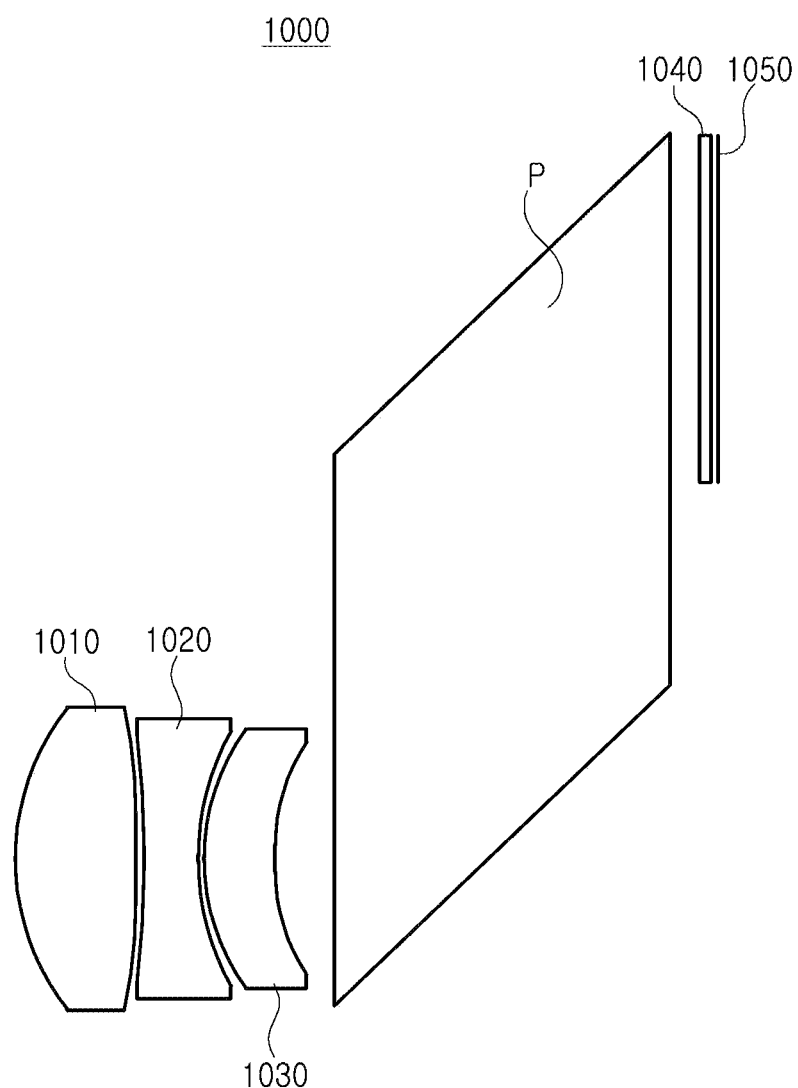
FIG. 19 is a view illustrating an optical imaging system according to a tenth example.
Figure 20:
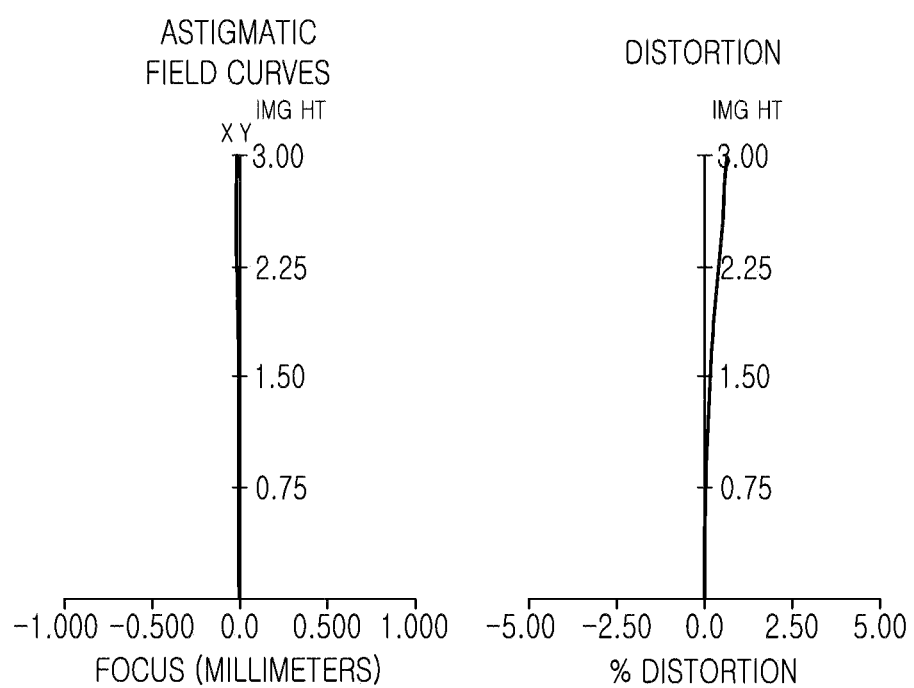
FIG. 20 illustrates aberration curves of the optical imaging system illustrated in FIG. 19.

An optical imaging system according to a tenth example will be described with reference to FIGS. 19 and 20.

An optical imaging system 1000 according to the tenth example may include a first lens 1010, a second lens 1020, and a third lens 1030 sequentially arranged from the object side.

The first lens 1010 may have positive refractive power, and both surfaces thereof may be convex. For example, first and second surfaces of the first lens 1010 may be convex in the paraxial region. The second lens 1020 may have negative refractive power, and both surfaces thereof may be concave. For example, first and second surfaces of the second lens 1020 may be concave in the paraxial region. The third lens 1030 may have positive refractive power and may have a meniscus shape that is convex toward the object side. For example, a first surface of the third lens 1030 may be convex in the paraxial region, and a second surface of the third lens 1030 may be concave in the paraxial region.

The optical imaging system 1000 may include a lens formed of a plastic material. For example, the first and second lenses 1010 and 1020 may be formed of a plastic material, and the third lens 1030 may be formed of a glass material. Further, according to the tenth example, the first and second lenses 1010 and 1020 may be formed of plastic materials having different optical characteristics. For example, Abbe numbers of the first lens 1010 and the second lens 1020 may be different from each other.

In addition, the optical imaging system 1000 may include a stop (not illustrated), a prism P, an infrared cut-off filter 1040, and an image sensor 1050. For example, the stop may be disposed on an object side of the first lens 1010. The prism P may be disposed between the third lens 1030 and the infrared cut-off filter 1040, and a path of light incident on the prism P may be changed twice in total.

Table 19 below illustrates characteristics of the optical imaging system 1000, and Table 20 illustrates values of aspherical surfaces of the optical imaging system 1000.

TABLE 19

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2* | First Lens | 4.762 | 2.000 | 1.537 | 55.7 |
| 3* | | −12.024 | 0.100 | | |
| 4* | Second Lens | −13.438 | 0.898 | 1.620 | 25.9 |
| 5* | | 6.244 | 0.100 | | |
| 6 | Third Lens | 4.317 | 1.145 | 2.119 | 17.0 |
| 7 | | 4.014 | 1.000 | | |
| 8 | Prism | Infinity | 2.500 | 1.519 | 64.2 |
| 9 | | Infinity | 9.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.099 | | |
| 14 | Imaging surface | Infinity | 0.001 | | |

(*aspherical surface)

TABLE 20

| Surface No. | 2 | 3 | 4 | 5 | 6 | 7 |
|---|---|---|---|---|---|---|
| K | 0.330 | −8.070 | −33.071 | 2.896 | 0.000 | 0.000 |
| A | −1.E−04 | 2.E−03 | 3.E−03 | 4.E−03 | 0.000 | 0.000 |
| B | −4.E−05 | −6.E−05 | −2.E−04 | −2.E−04 | 0.000 | 0.000 |
| C | 0.000 | 0.000 | 0.000 | 0.000 | 0.000 | 0.000 |
| D | 0.000 | 0.000 | 0.000 | 0.000 | 0.000 | 0.000 |
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

Figure 21:
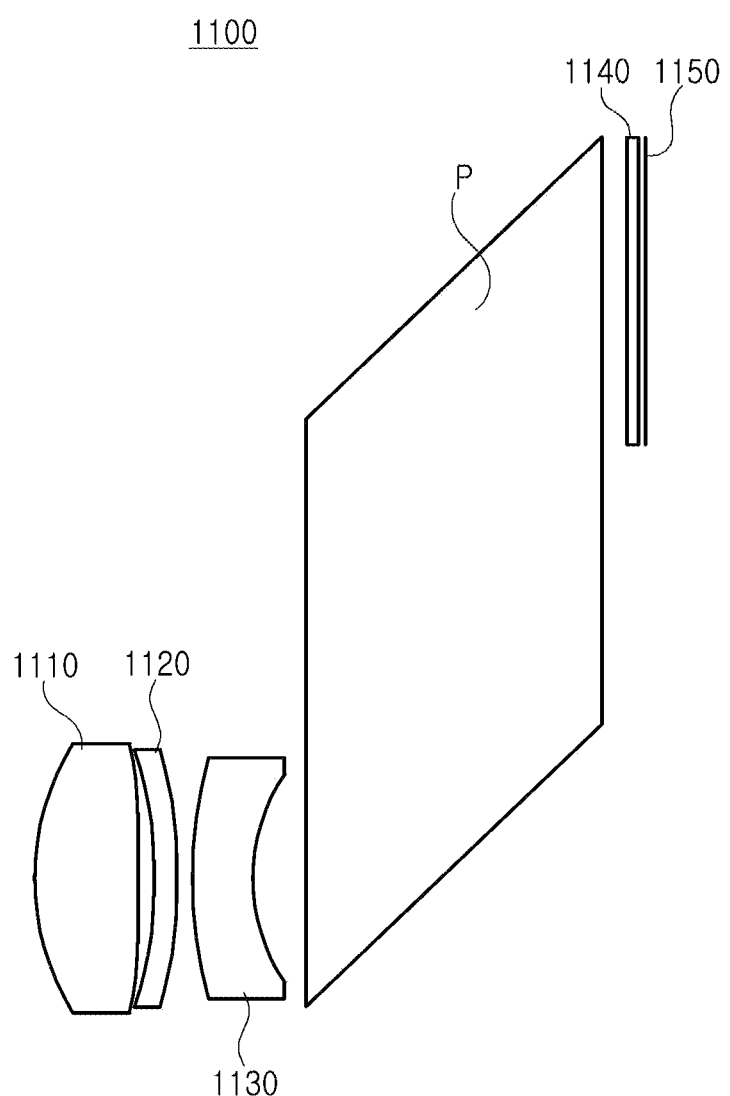
FIG. 21 is a diagram illustrating an optical imaging system according to an eleventh example.
Figure 22:
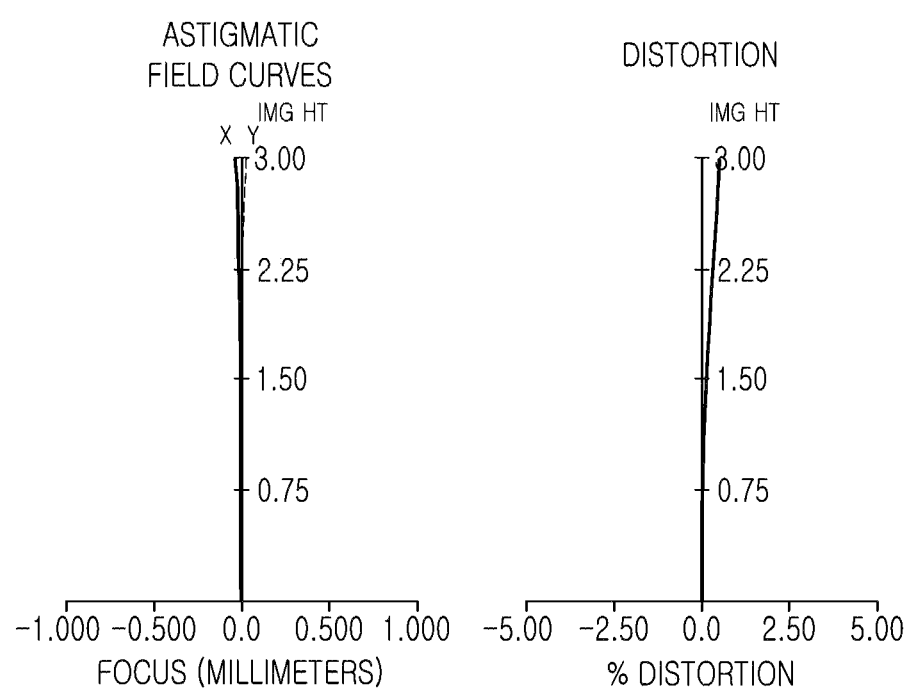
FIG. 22 illustrates aberration curves of the optical imaging system illustrated in FIG. 21.

Next, an optical imaging system according to an eleventh example will be described with reference to FIGS. 21 and 22.

An optical imaging system 1100 according to the eleventh example may include a first lens 1110, a second lens 1120, and a third lens 1130 sequentially arranged from the object side.

The first lens 1110 may have positive refractive power, and both surfaces thereof may be convex. For example, first and second surfaces of the first lens 1110 may be convex in the paraxial region. The second lens 1120 may have negative refractive power and may have a meniscus shape in which it is convex toward the image. For example, a first surface of the second lens 1120 may be concave in the paraxial region, and a second surface of the second lens 1120 may be convex in the paraxial region. The third lens 1130 may have negative refractive power and may have a meniscus shape that is convex toward the object side. For example, a first surface of the third lens 1130 may be convex in the paraxial region, and a second surface of the third lens 1130 may be concave in the paraxial region.

The optical imaging system 1100 may include a lens formed of a plastic material. For example, the first lens 1110 may be formed of a glass material, and the second and third lenses 1120 and 1130 may be formed of a plastic material. Further, according to the eleventh example, the second and third lenses 1120 and 1130 may be formed of plastic materials having different optical characteristics. For example, Abbe numbers of the second lens 1120 and the third lens 1130 may be different from each other.

In addition, the optical imaging system 1100 may include a stop (not illustrated), a prism P, an infrared cut-off filter 1140, and an image sensor 1150. For example, the stop may be disposed on an object side of the first lens 1110. The prism P may be disposed between the third lens 1130 and the infrared cut-off filter 1140, and a path of light incident on the prism P may be changed twice in total.

Table 21 below illustrates characteristics of the optical imaging system 1100, and Table 22 illustrates values of aspherical surfaces of the optical imaging system 1100.

TABLE 21

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2 | First Lens | 5.414 | 1.924 | 1.498 | 81.6 |
| 3 | | −22.598 | 0.300 | | |
| 4 | Second Lens | −8.908 | 0.400 | 1.537 | 55.7 |
| 5 | | −9.567 | 0.300 | | |
| 6* | Third Lens | 7.220 | 1.107 | 1.571 | 37.4 |
| 7* | | 3.298 | 1.000 | | |
| 8 | Prism | Infinity | 2.500 | 1.519 | 64.2 |
| 9 | | Infinity | 11.500 | 1.519 | 64.2 |
| 10 | | Infinity | 3.000 | 1.519 | 64.2 |
| 11 | | Infinity | 0.500 | | |
| 12 | Filter | Infinity | 0.210 | 1.519 | 64.2 |
| 13 | | Infinity | 0.097 | | |
| 14 | Imaging surface | Infinity | 0.003 | | |

(*aspherical surface)

TABLE 22

| Surface No. | 2 | 3 | 4 | 5 | 6 | 7 |
|---|---|---|---|---|---|---|
| K | 0.000 | 0.000 | 0.000 | 0.000 | −4.552 | −1.444 |
| A | 0.000 | 0.000 | 0.000 | 0.000 | −3.E−03 | −7.E−04 |
| B | 0.000 | 0.000 | 0.000 | 0.000 | 5.E−05 | 2.E−04 |
| C | 0.000 | 0.000 | 0.000 | 0.000 | 0.000 | 0.000 |
| D | 0.000 | 0.000 | 0.000 | 0.000 | 0.000 | 0.000 |
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

Figure 23:
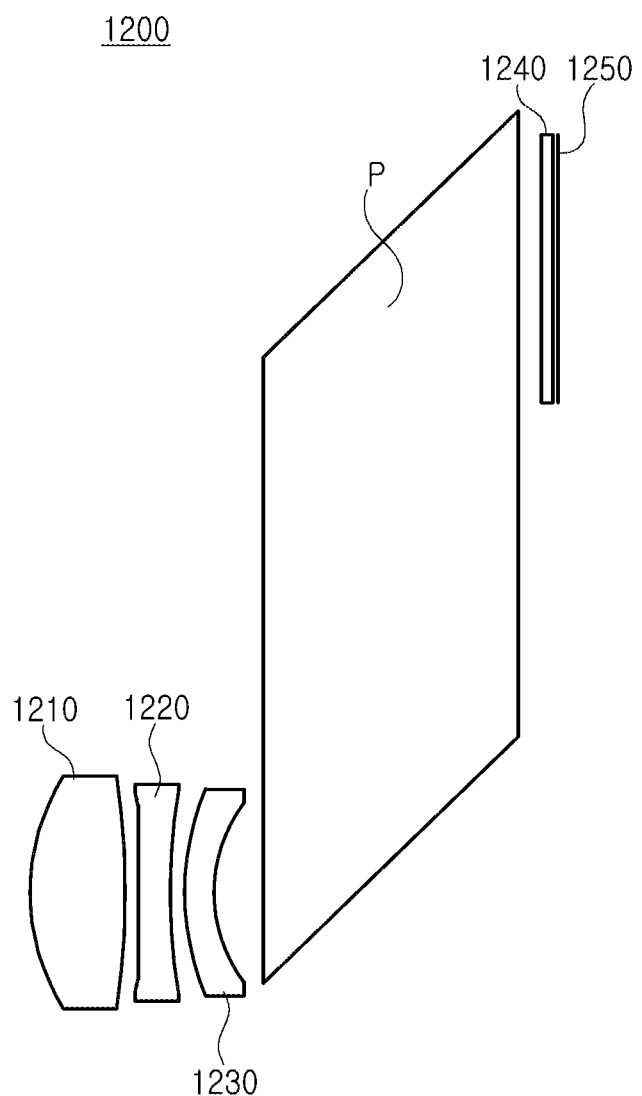
FIG. 23 is a diagram illustrating an optical imaging system according to a twelfth example.
Figure 24:
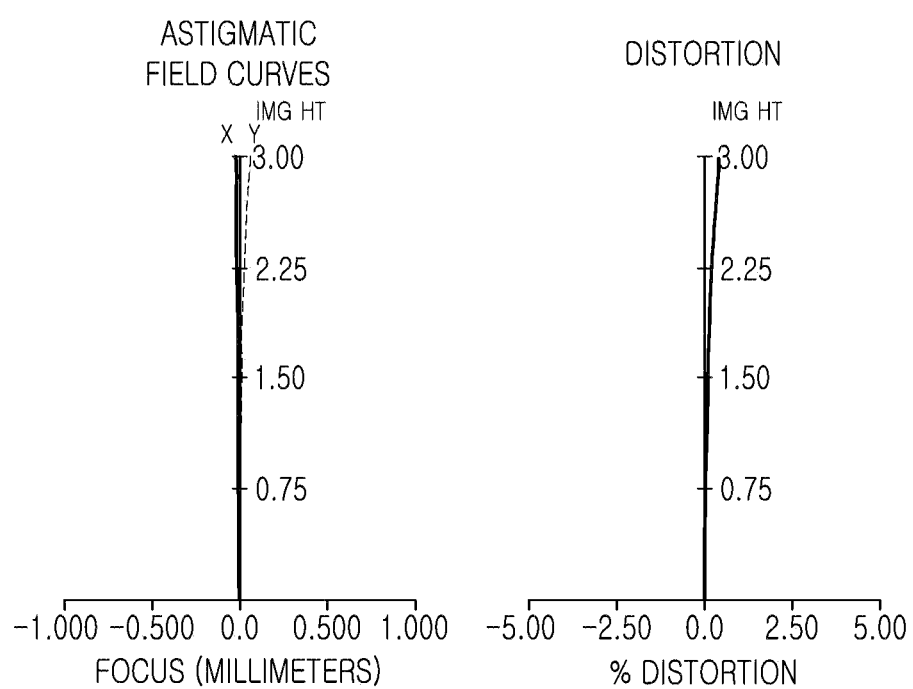
FIG. 24 illustrates aberration curves of the optical imaging system illustrated in FIG. 23.

Next, an optical imaging system according to a twelfth example will be described with reference to FIGS. 23 and 24.

An optical imaging system 1200 according to the twelfth example may include a first lens 1210, a second lens 1220, and a third lens 1230 sequentially arranged from the object side.

The first lens 1210 may have positive refractive power, and both surfaces thereof may be convex. For example, first and second surfaces of the first lens 1210 may be convex in the paraxial region. The second lens 1220 may have negative refractive power, and both surfaces thereof may be concave. For example, first and second surfaces of the second lens 1220 may be concave in the paraxial region. The third lens 1230 may have negative refractive power and may have a meniscus shape that is convex toward the object side. For example, a first surface of the third lens 1230 may be convex in the paraxial region, and a second surface of the third lens 1230 may be concave in the paraxial region.

The optical imaging system 1200 may include a lens formed of a plastic material. For example, the first lens 1210 may be formed of a glass material, and the second and third lenses 1220 and 1230 may be formed of a plastic material. Further, according to the twelfth example, the second and third lenses 1220 and 1230 may be formed of plastic materials having different optical characteristics. For example, Abbe numbers of the second lens 1220 and the third lens 1230 may be different from each other.

In addition, the optical imaging system 1200 may include a stop (not illustrated), a prism P, an infrared cut-off filter 1240, and an image sensor 1250. For example, the stop may be disposed on an object side of the first lens 1210. The prism P may be disposed between the third lens 1230 and the infrared cut-off filter 1240, and a path of light incident on the prism P may be changed twice in total.

Table 23 below illustrates characteristics of the optical imaging system 1200, and Table 24 illustrates values of aspherical surfaces of the optical imaging system 1200.

TABLE 23

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2 | First Lens | 5.364 | 2.000 | 1.498 | 81.6 |
| 3 | | −19.328 | 0.300 | | |
| 4* | Second Lens | −85.135 | 0.703 | 1.537 | 55.7 |
| 5* | | 21.371 | 0.300 | | |
| 6* | Third Lens | 5.133 | 0.625 | 1.571 | 37.4 |
| 7* | | 3.104 | 1.000 | | |
| 8 | Prism | Infinity | 2.500 | 1.519 | 64.2 |
| 9 | | Infinity | 14.000 | 1.519 | 64.2 |
| 10 | | Infinity | 3.500 | 1.519 | 64.2 |
| 11 | | Infinity | 0.500 | | |
| 12 | Filter | Infinity | 0.210 | 1.519 | 64.2 |
| 13 | | Infinity | 0.097 | | |
| 14 | Imaging surface | Infinity | 0.003 | | |

(*aspherical surface)

TABLE 24

| Surface No. | 2 | 3 | 4 | 5 | 6 | 7 |
|---|---|---|---|---|---|---|
| K | 0.000 | 0.000 | 88.493 | −10.109 | −4.311 | −1.187 |
| A | 0.000 | 0.000 | −2.E−04 | 2.E−03 | −5.E−04 | −3.E−03 |
| B | 0.000 | 0.000 | −6.E−05 | −2.E−04 | −1.E−04 | 2.E−04 |
| C | 0.000 | 0.000 | 0.000 | 0.000 | 0.000 | 0.000 |
| D | 0.000 | 0.000 | 0.000 | 0.000 | 0.000 | 0.000 |
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

Figure 25:
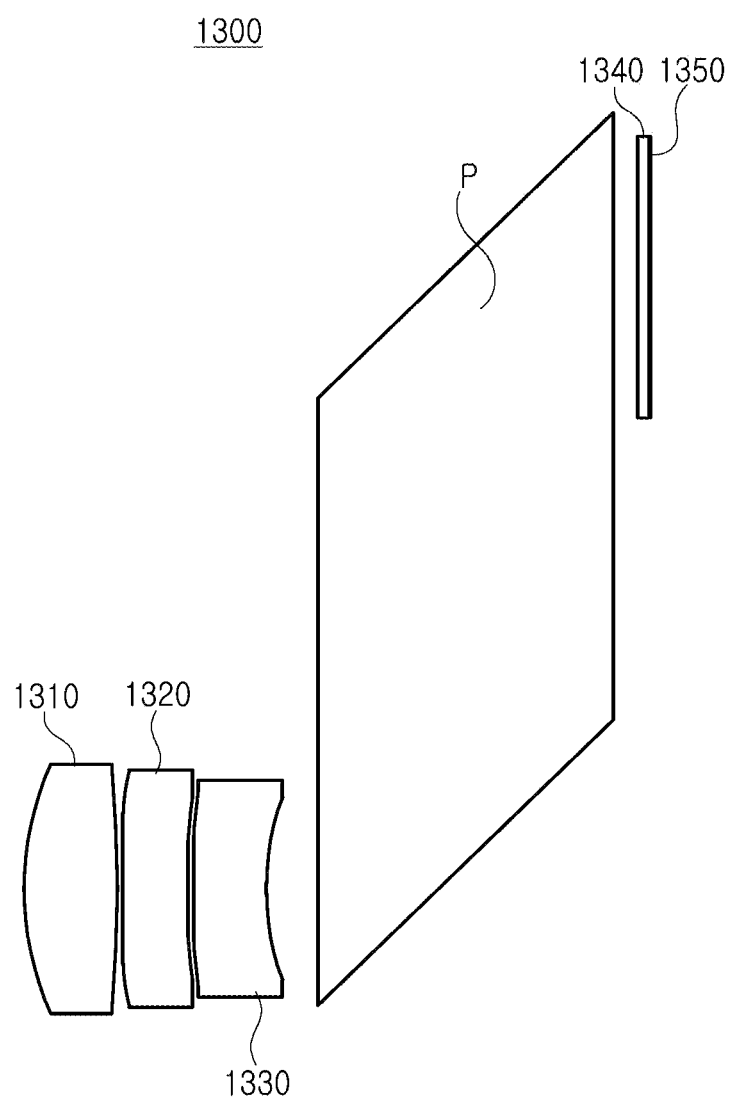
FIG. 25 is a view illustrating an optical imaging system according to a thirteenth example.
Figure 26:
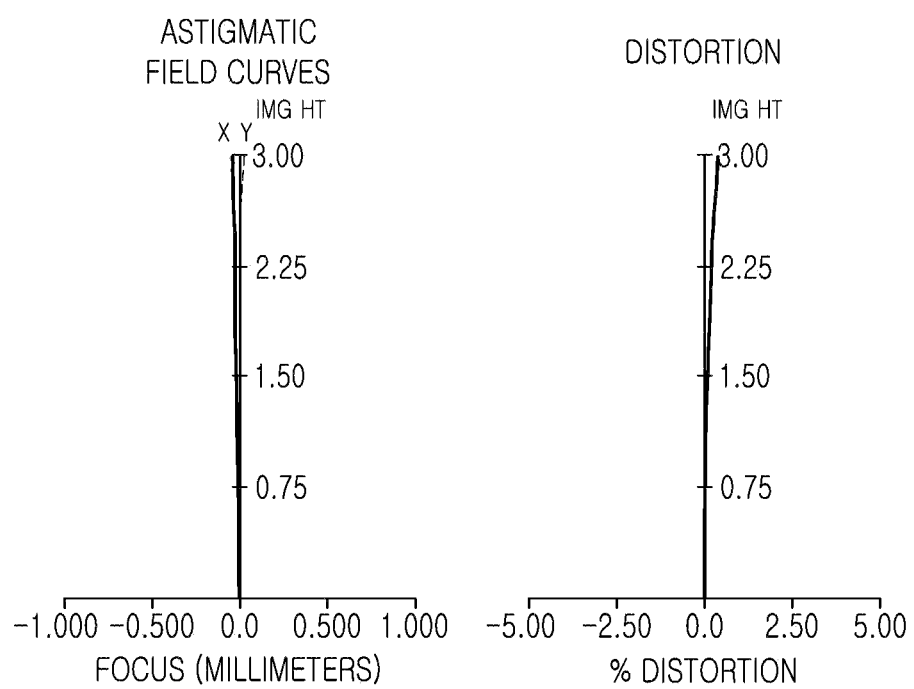
FIG. 26 illustrates aberration curves of the optical imaging system illustrated in FIG. 25.

An optical imaging system according to a thirteenth example will be described with reference to FIGS. 25 and 26.

An optical imaging system 1300 according to the thirteenth example may include a first lens 1310, a second lens 1320, and a third lens 1330 sequentially arranged from the object side.

The first lens 1310 may have positive refractive power, and both surfaces thereof may be convex. For example, first and second surfaces of the first lens 1310 may be convex in the paraxial region. The second lens 1320 may have negative refractive power and may have a meniscus shape that is convex toward the object side. For example, a first surface of the second lens 1320 may be convex in the paraxial region, and a second surface of the second lens 1320 may be concave in the paraxial region. The third lens 1330 may have negative refractive power and may have a meniscus shape that is convex toward the object side. For example, a first surface of the third lens 1330 may be convex in the paraxial region, and a second surface of the third lens 1330 may be concave in the paraxial region.

The optical imaging system 1300 may include a lens formed of a plastic material. For example, all of the first to third lenses 1310, 1320, and 1330 may be formed of a plastic material. Further, according to the thirteenth example, at least some of the first to third lenses 1310, 1320, and 1330 may be formed of plastic materials having different optical characteristics. For example, an Abbe number of the third lens 1330 may be different from those of the first lens 1310 and the second lens 1320.

In addition, the optical imaging system 1300 may include a stop (not illustrated), a prism P, an infrared cut-off filter 1340, and an image sensor 1350. For example, the stop may be disposed on an object side of the first lens 1310. The prism P may be disposed between the third lens 1330 and the infrared cut-off filter 1340, and a path of light incident on the prism P may be changed twice in total.

Table 25 below illustrates characteristics of the optical imaging system 1300, and Table 26 illustrates values of aspherical surfaces of the optical imaging system 1300.

TABLE 25

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2* | First Lens | 6.770 | 1.898 | 1.537 | 55.7 |
| 3* | | -14.433 | 0.100 | | |
| 4* | Second Lens | 78.050 | 1.327 | 1.537 | 55.7 |
| 5* | | 15.204 | 0.117 | | |
| 6* | Third Lens | 28.675 | 1.500 | 1.646 | 23.5 |
| 7* | | 7.169 | 1.000 | | |
| 8 | Prism | Infinity | 2.500 | 1.519 | 64.2 |
| 9 | | Infinity | 13.000 | 1.519 | 64.2 |
| 10 | | Infinity | 3.500 | 1.519 | 64.2 |
| 11 | | Infinity | 0.500 | | |
| 12 | Filter | Infinity | 0.210 | 1.519 | 64.2 |
| 13 | | Infinity | 0.095 | | |
| 14 | Imaging surface | Infinity | 0.005 | | |

(*aspherical surface)

TABLE 26

| Surface No. | 2 | 3 | 4 | 5 | 6 | 7 |
|---|---|---|---|---|---|---|
| K | -0.395 | 5.972 | 99.000 | 9.742 | 71.736 | -0.686 |
| A | -5.E-05 | 2.E-03 | 1.E-04 | -3.E-03 | 1.E-03 | 4.E-03 |
| B | 4.E-07 | 5.E-05 | 3.E-04 | 3.E-04 | -1.E-03 | -2.E-04 |
| C | 0.000 | 0.000 | 0.000 | 0.000 | 0.000 | 0.000 |
| D | 0.000 | 0.000 | 0.000 | 0.000 | 0.000 | 0.000 |
| E | 0.000 | 0.000 | 0.000 | 0.000 | 0.000 | 0.000 |
| F | 0.000 | 0.000 | 0.000 | 0.000 | 0.000 | 0.000 |
| G | 0.000 | 0.000 | 0.000 | 0.000 | 0.000 | 0.000 |

TABLE 26-continued

| Surface No. | 2 | 3 | 4 | 5 | 6 | 7 |
|---|---|---|---|---|---|---|
| H | 0.000 | 0.000 | 0.000 | 0.000 | 0.000 | 0.000 |
| J | 0.000 | 0.000 | 0.000 | 0.000 | 0.000 | 0.000 |

Figure 27:
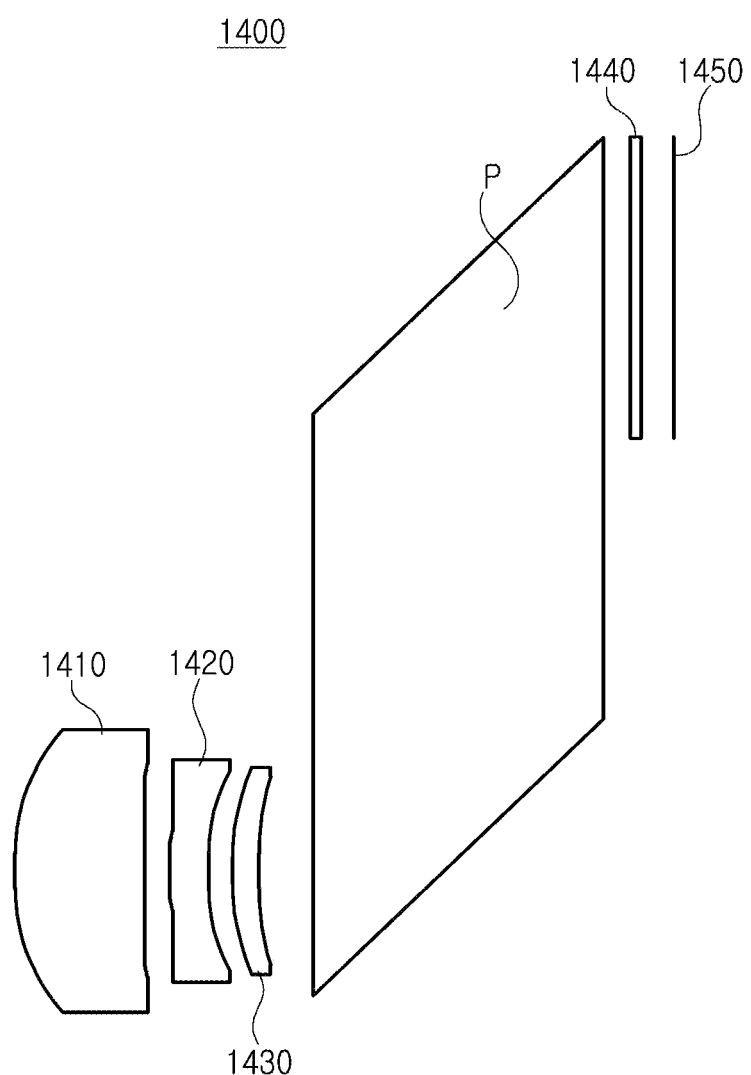
FIG. 27 is a diagram illustrating an optical imaging system according to a fourteenth example.
Figure 28:
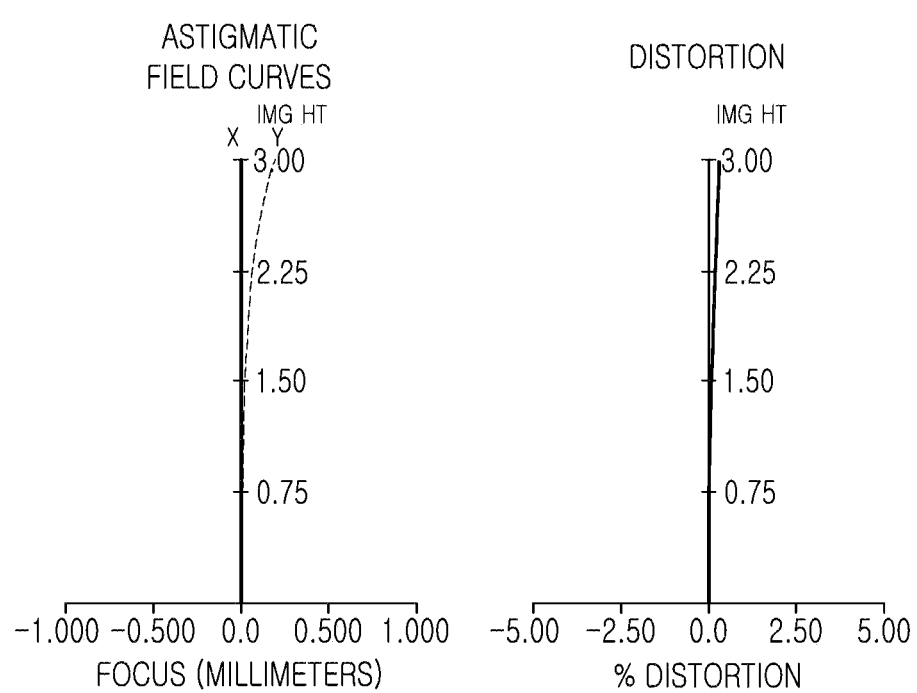
FIG. 28 illustrates aberration curves of the optical imaging system illustrated in FIG. 27.

An optical imaging system according to a fourteenth example will be described with reference to FIGS. 27 and 28.

An optical imaging system 1400 according to the fourteenth example may include a first lens 1410, a second lens 1420, and a third lens 1430 sequentially arranged from the object side.

The first lens 1410 may have positive refractive power and may have a meniscus shape that is convex toward the object side. For example, a first surface of the first lens 1410 may be convex in the paraxial region, and a second surface of the first lens 1410 may be concave in the paraxial region. The second lens 1420 may have negative refractive power and may have a meniscus shape that is convex toward the object side. For example, a first surface of the second lens 1420 may be convex in the paraxial region, and a second surface of the second lens 1420 may be concave in the paraxial region. The third lens 1430 may have positive refractive power and may have a meniscus shape that is convex toward the object side. For example, a first surface of the third lens 1430 may be convex in the paraxial region, and a second surface of the third lens 1430 may be concave in the paraxial region.

The optical imaging system 1400 may include a lens formed of a plastic material. For example, the first lens 1410 may be formed of a glass material, and the second and third lenses 1420 and 1430 may be formed of a plastic material. Further, according to the fourteenth example, the second and third lenses 1420 and 1430 may be formed of plastic materials having different optical characteristics. For example, Abbe numbers of the second lens 1420 and the third lens 1430 may be different from each other.

In addition, the optical imaging system 1400 may include a stop (not illustrated), a prism P, an infrared cut-off filter 1440, and an image sensor 1450. For example, the stop may be disposed on an image side of the second lens 1420. The prism P may be disposed between the third lens 1430 and the infrared cut-off filter 1440, and a path of light incident on the prism P may be changed twice in total.

Table 27 below illustrates characteristics of the optical imaging system 1400, and Table 28 illustrates values of aspherical surfaces of the optical imaging system 1400.

TABLE 27

| Surface No. | Remark | Radius of Curvature | Thickness or Interval | Refractive Index | Abbe Number |
|---|---|---|---|---|---|
| 0 | Object | Infinity | Infinity | | |
| 1 | | Infinity | 0.000 | | |
| 2* | First Lens | 5.040 | 2.436 | 1.585 | 59.5 |
| 3* | | 66.923 | 0.500 | | |
| 4* | Second Lens | 23.956 | 0.675 | 1.621 | 26.0 |
| 5* | | 4.169 | 0.500 | | |
| 6* | Third Lens | 6.635 | 0.500 | 1.679 | 19.2 |
| 7* | | 10.301 | 0.100 | | |
| 8 | Prism | Infinity | 2.500 | 1.519 | 64.2 |
| 9 | | Infinity | 13.000 | 1.519 | 64.2 |
| 10 | | Infinity | 3.500 | 1.519 | 64.2 |
| 11 | | Infinity | 0.500 | | |

TABLE 27-continued

| Surface No. | Remark | Radius of Curvature | Thickness or Interval | Refractive Index | Abbe Number |
|---|---|---|---|---|---|
| 12 | Filter | Infinity | 0.210 | 1.519 | 64.2 |
| 13 | | Infinity | 0.622 | | |
| 14 | Imaging surface | Infinity | −0.010 | | |

(*aspherical surface)

TABLE 28

| Surface No. | 2 | 3 | 4 | 5 | 6 | 7 |
|---|---|---|---|---|---|---|
| K | 0.215 | −99.000 | 37.702 | 0.233 | −1.286 | 10.147 |
| A | 3.E−05 | −6.E−03 | −3.E−02 | −3.E−02 | 4.E−03 | 1.E−02 |
| B | 2.E−04 | 2.E−02 | 5.E−02 | 6.E−02 | −2.E−03 | −2.E−02 |
| C | −1.E−04 | −1.E−02 | −5.E−02 | −8.E−02 | −9.E−03 | 1.E−02 |
| D | 4.E−05 | 8.E−03 | 4.E−02 | 7.E−02 | 1.E−02 | −7.E−03 |
| E | −7.E−06 | −3.E−03 | −1.E−02 | −3.E−02 | −7.E−03 | 3.E−03 |
| F | 7.E−07 | 5.E−04 | 3.E−03 | 9.E−03 | 2.E−03 | −6.E−04 |
| G | −3.E−08 | −6.E−05 | −5.E−04 | −2.E−03 | −3.E−04 | 1.E−04 |
| H | −4.E−10 | 4.E−06 | 4.E−05 | 1.E−04 | 3.E−05 | −9.E−06 |
| J | 4.E−11 | −1.E−07 | −1.E−06 | −6.E−06 | −9.E−07 | 3.E−07 |

The following Table 29 illustrates characteristics of the optical imaging systems according to the first to fourteenth examples.

TABLE 29

| Remark | Ex1 | Ex2 | Ex3 | Ex4 | Ex5 | Ex6 | Ex7 |
|---|---|---|---|---|---|---|---|
| f | 19.00 | 17.62 | 19.00 | 19.00 | 21.00 | 19.00 | 19.00 |
| f1 | 8.49 | 5.83 | 13.43 | 12.06 | 10.81 | 5.99 | 5.70 |
| f2 | −8.02 | −17.09 | −13.43 | −19.11 | −33.39 | −20.00 | −20.00 |
| f3 | 31.62 | −10.78 | 23.11 | 110.28 | −23.29 | −9.88 | −8.94 |
| TTL | 23.169 | 21.758 | 23.716 | 23.782 | 24.510 | 22.786 | 23.327 |
| PL | 17.000 | 17.000 | 17.000 | 17.000 | 17.000 | 17.000 | 17.000 |
| BFL | 18.80 | 18.80 | 18.81 | 18.80 | 18.90 | 18.80 | 18.80 |

| | Ex8 | Ex9 | Ex10 | Ex11 | Ex12 | Ex13 | Ex14 |
|---|---|---|---|---|---|---|---|
| f | 20.00 | 22.00 | 18.00 | 19.00 | 21.00 | 21.00 | 19.96 |
| f1 | 8.23 | 9.91 | 6.63 | 8.97 | 8.86 | 8.86 | 9.18 |
| f2 | −31.20 | −15.34 | −6.76 | −305.55 | −31.73 | −35.41 | −8.24 |
| f3 | −13.74 | −65.49 | 51.26 | −11.85 | −15.49 | −15.22 | 26.01 |
| TTL | 24.040 | 25.470 | 21.053 | 22.840 | 25.739 | 25.751 | 25.934 |
| PL | 17.000 | 19.000 | 15.000 | 17.000 | 20.000 | 19.000 | 19.000 |
| BFL | 18.90 | 20.80 | 19.80 | 18.80 | 21.80 | 20.80 | 21.30 |

As set forth above, the optical imaging system according to the various examples may have a small size (small thickness) while having a long focal length.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having a positive refractive power, a second lens having a negative refractive power, a concave object-side surface in a paraxial region thereof, and a convex image-side surface in a paraxial region thereof, a third lens having a negative refractive power and a concave image-side surface in a paraxial region thereof, a reflective member, and an image sensor sequentially disposed along an optical axis of the optical imaging system from an object side of the optical imaging system toward an imaging surface of the image sensor,
   wherein the reflective member is a parallelogram-shaped prism comprising at least two reflective surfaces configured to change a path of light passing through the first to third lenses and incident on the reflective surfaces at least twice,
   the first lens, the second lens, and the third lens are the only lenses having a refractive power in the optical imaging system,
   $0.80 \leq PL/f < 0.98$, where PL is a length of a path of the light in the reflective member, and f is a focal length of the optical imaging system, and
   $1 < TTL/f < 1.4$, where TTL is a distance along the optical axis from an object-side surface of the first lens to the imaging surface of the image sensor.

2. The optical imaging system of claim 1, wherein the third lens is made of plastic.

3. The optical imaging system of claim 1, wherein the third lens is made of glass.

4. The optical imaging system of claim 1, wherein $50<v1<90$, where v1 is an Abbe number of the first lens.

5. The optical imaging system of claim 1, wherein $0.1<LL/PL<0.4$, where LL is a distance along the optical axis from the object-side surface of the first lens to the image-side surface of the third lens.

6. The optical imaging system of claim 1, wherein either one or both of the object-side surface of the first lens and an object-side surface of the third lens is convex in a paraxial region thereof.

7. The optical imaging system of claim 1, wherein $0.02<BFL/f<1.0$, where BFL is a distance along the optical axis from the image-side surface of the third lens to the imaging surface of the image sensor.

8. The optical imaging system of claim 1, wherein one of the first lens and the second lens is made of glass, and another one of the first lens and the second lens is made of plastic.

9. The optical imaging system of claim 8, wherein $0 \leq v1-v2<56$, where v1 is an Abbe number of the first lens, and v2 is an Abbe number of the second lens.

10. The optical imaging system of claim 1, wherein $-20<f2/f<-0.3$, where f2 is a focal length of the second lens.

11. The optical imaging system of claim 1, wherein $-3.5<f3/f<0$, where f3 is a focal length of the third lens.

* * * * *